United States Patent
Fracastoro et al.

(10) Patent No.: US 10,616,603 B2
(45) Date of Patent: Apr. 7, 2020

(54) METHODS AND APPARATUSES FOR ENCODING AND DECODING DIGITAL IMAGES THROUGH SUPERPIXELS

(71) Applicant: SISVEL TECHNOLOGY S.R.L., None (TO) (IT)

(72) Inventors: Giulia Fracastoro, Turin (IT); Enrico Magli, Turin (IT); Francesco Verdoja, Rivalta di Turin (IT); Marco Grangetto, Pinerolo (IT)

(73) Assignee: Sisvel Technology S.R.L., None (TO) (IT)

( * ) Notice: Subject to any disclaimer, the term of this patent is extended or adjusted under 35 U.S.C. 154(b) by 111 days.

(21) Appl. No.: 15/762,496

(22) PCT Filed: Sep. 23, 2016

(86) PCT No.: PCT/IB2016/055684
§ 371 (c)(1),
(2) Date: Mar. 22, 2018

(87) PCT Pub. No.: WO2017/051358
PCT Pub. Date: Mar. 30, 2017

(65) Prior Publication Data
US 2018/0278957 A1 Sep. 27, 2018

(30) Foreign Application Priority Data
Sep. 25, 2015 (IT) .................. 102015000055555

(51) Int. Cl.
*G06K 9/46* (2006.01)
*H04N 19/60* (2014.01)
(Continued)

(52) U.S. Cl.
CPC ............... *H04N 19/60* (2014.11); *G06K 9/34* (2013.01); *G06K 9/6224* (2013.01); *G06T 7/11* (2017.01); *H04N 19/17* (2014.11); *H04N 19/182* (2014.11)

(58) Field of Classification Search
None
See application file for complete search history.

(56) References Cited

U.S. PATENT DOCUMENTS 5,666,212 A * 9/1997 Gilge .................. H04N 19/196
358/426.12
6,516,094 B1 * 2/2003 Takahashi ............... G06T 9/007
382/233

(Continued)

OTHER PUBLICATIONS

Jäger, "Contour-based segmentation and coding for depth map compression." In 2011 Visual Communications and Image Processing (VCIP), pp. 1-4. IEEE, 2011. (Year: 2011).*

(Continued)

*Primary Examiner* — Feng Niu
(74) *Attorney, Agent, or Firm* — Workman Nydegger

(57) ABSTRACT

A method and an apparatus for encoding and/or decoding digital images or video streams are provided, wherein the encoding apparatus includes a processor configured for reading at least a portion of the image, segmenting the portion of the image in order to obtain groups of pixels identified by borders information and containing at least two pixels having one or more homogeneous characteristics, computing, for each group of pixels, a weight map on the basis of the borders information associated to the group of pixels, a graph transform matrix on the basis of the weight map, and transform coefficients on the basis of the graph transform matrix (U) and of the pixels contained in the group of pixels.

16 Claims, 14 Drawing Sheets

(51) Int. Cl.
| | |
|---|---|
| H04N 19/17 | (2014.01) |
| G06K 9/34 | (2006.01) |
| G06K 9/62 | (2006.01) |
| H04N 19/182 | (2014.01) |
| G06T 7/11 | (2017.01) |

(56) References Cited

U.S. PATENT DOCUMENTS

| | | | | |
|---|---|---|---|---|
| 6,798,834 | B1* | 9/2004 | Murakami | H04N 19/105 375/240.12 |
| 7,418,148 | B2* | 8/2008 | Hayashi | H04N 1/41 348/E5.042 |
| 8,712,154 | B2* | 4/2014 | Perbet | G06K 9/6224 382/173 |
| 8,873,812 | B2* | 10/2014 | Larlus-Larrondo | G06K 9/00 382/103 |
| 9,020,270 | B2* | 4/2015 | Ruan | G06T 7/143 382/195 |
| 9,189,861 | B2* | 11/2015 | Ruan | G06K 9/3233 |
| 9,600,746 | B2* | 3/2017 | Ruan | G06K 9/3233 |
| 9,736,455 | B2* | 8/2017 | Georgiev | H04N 13/161 |
| 2005/0069214 | A1* | 3/2005 | Hayashi | H04N 1/41 382/251 |
| 2011/0206288 | A1 | 8/2011 | Lee et al. | |
| 2012/0251003 | A1 | 10/2012 | Perbet et al. | |
| 2012/0327172 | A1* | 12/2012 | El-Saban | G06K 9/00228 348/14.02 |
| 2014/0037198 | A1* | 2/2014 | Larlus-Larrondo | G06K 9/00 382/159 |
| 2014/0211000 | A1* | 7/2014 | Herman | G02B 26/0833 348/136 |
| 2015/0363664 | A1* | 12/2015 | Chang | G06K 9/46 382/164 |
| 2016/0094829 | A1* | 3/2016 | Georgiev | H04N 13/161 348/43 |
| 2018/0204085 | A1* | 7/2018 | Chennubhotla | G06K 9/4652 |
| 2018/0242004 | A1* | 8/2018 | Park | H04N 19/503 |

OTHER PUBLICATIONS

Ernesto Bribiesca, *A New Chain Code*, Pattern Recognition, vol. 32, 1999, pp. 235-251.

Gaurav Sharma et al., *The CIEDE2000 Color-Difference Formula: Implementation Notes, Supplementary Test Data, and Mathematical Observations*, vol. 30, No. 1, Feb. 2005, pp. 21-30.

Sunil K. Narang et al., *Critically Sampled Graph-Based Wavelet Transforms for Image Coding*, Department of Electrical Engineering, University of Southern California, APSIPA 2013 Proceedings, pp. 4.

Woo-Shik Kim et al., *Graph Based Transforms for Depth Video Coding*, IEEE 2012, ICASSP, pp. 813-816.

Pedro f. Felzenszwalb et al., *Efficient Graph-Based Image Segmentation*, International Journal of Computer Vision, vol. 59, No. 2, 2004, pp. 167-181.

Guy E. Blelloch, *Introduction to Data Compression*, Computer Science Department, Carnegie Mellon University, Oct. 16, 2001, pp. 54.

P. C. Mahalanobis, *On the Generalized Distance in Statistics*, vol. 11, No. 1., Apr. 15, 1936, pp. 49-55.

Jianbo Shi et al, *Normalized Cuts and Image Segmentation*, University of Pennsylvania, IEEE 2000, vol. 22, Issue 8, pp. 888-905.

Herbert Freeman, *On the Encoding of Arbitrary Geometric Configurations*, IRE Transactions on Electronic Computers, Jan. 27, 1961, pp. 260-268.

David I. Shuman et al., *The Emerging Field of Signal Processing on Graphs*, IEEE Signal Processing Magazine, May 2013, pp. 83-98.

Xuewen Zhang et al., *SLIC Superpixels for Efficient Graph-Based Dimensionality Reduction of Hyperspectral Imagery*, EPFL Technical Report No. 149300, Jun. 2010, pp. 14.

Gabriel Taubin, *A Signal Processing Approach to Fair Surface Design*, IBM T.J. Watson Research Center, 1995, pp. 8.

International Search Report dated Dec. 19, 2016, issued in PCT Application No. PCT/IB2016/055684, filed Sep. 23, 2016.

Chi-Yu Hsu et al., *Efficient Image Segmentation Algorithm Using SLIC Superpixels and Boundary-focused Region Merging*, 2013 9th International Conference on Information, communications & Signal Processing, IEEE, Dec. 10, 2013, XP032584474, pp. 5.

Wei Hu, et al., *Multiresolution Graph Fourier Transform for Compression of Piecewise Smooth Images*, IEEE Translations on Image Processing, vol. 24, No. 1, Jan. 2015, XP011569005, pp. 419-426.

Woo-Shik Kim et al., *Graph Based Transforms for Depth Video Coding*, 2012 IEEE International Conference on Acoustics, speech and Signal Processing, Mar. 25-30, 2012, XP032227251, pp. 813-816.

David I. Shuman et al., *The Emerging Field of Signal Processing on Graphs*, IEEE Signal Processing Magazine, vol. 30, No. 3, May 1, 2013, XP011514759, pp. 83-98.

A. Sandryhaila et al. *Nearest-Neighbor Image Model*, published in ICIP 2012 proceedings.

X. Ren, J. Malik, *Learning a Classification Model for Segmentation*, International Conference on Computer Vision, pp. 10-17, 2003.

A. Levinshtein, et al., *TurboPixels: Fast Superpixels Using Geometric Flows*, Transactions on Pattern Analysis and Machine Intelligence, 31(12):2290-2297, 2009.

M-Y Lui, et al., *Entropy Rate Superpixel Segmentation*, Conference on Computer Vision and Pattern Recognition, pp. 2097-2104, 2011.

M. Van den Bergh, et al., *SEEDS: Superpixels Extracted Via Energy-Driven Sampling*, European Conference on Computer Vision, pp. 13-26, 2016.

Radhakrishna Achanta, Appu Shaji, Kevin Smith, Aurelien Lucchi, Pascal Fua, and Sabine Süsstrunk,"*SLIC Superpixels*", EPFL Technical Report No. 149300, Jun. 2010.

Ismael Daribo, et al., "*Arbitrarily Shaped Motion Prediction for Depth Video Compression using Arithmetic Edge Coding*," IEEE Transactions on Image Processing, Aug. 2014.

C. Conrad, et al., *Contour-Relaxed Superpixels*, Energy Minimization Methods in Computer Vision and Pattern Recognition, vol. 8081 of Lecture Notes in Computer Science, pp. 280-293, 2013.

Wikipedia article, *Bhattacharyya Distance*, extracted from Wikipedia on Aug. 3, 2015, pp. 5.

* cited by examiner (a)

(b)

(c)

(a)

(b)

```
     1   2   3   5   6   9
  --+------------------------
  1 | 0   1   0   0   0   0
  2 | 1   0   1   1   0   0
  3 | 0   1   0   0   1   0
  5 | 0   1   0   0   1   0
  6 | 0   0   1   1   0   1
  9 | 0   0   0   0   1   0
```

(c)

(d)

(a)

(b)

(c)

(a)

(b)

(a)

(b)

(a)

(b)

METHODS AND APPARATUSES FOR ENCODING AND DECODING DIGITAL IMAGES THROUGH SUPERPIXELS

BACKGROUND OF THE INVENTION

Field of the Invention

The present invention is relative to the field of digital image and video coding. Namely, the present invention describes a method and system for compressing and decompressing images, especially natural images, so that they can be delivered over bandwidth-constrained channels or stored on capacity-limited media.

Problem Faced by the Invention

The problem addressed by this invention is the encoding of images and video sequences composed by images as well.

Most of the existing techniques rely, as the basic encoding tool, on a block-based transform known as the Discrete Cosine Transform (DCT), as for example in the various JPEG and MPEG coding standards. The image is subdivided into blocks having a square shape and then the DCT is applied to each block (possibly adapting the size of the block to the image characteristics), which is then independently encoded and decoded in the simplest case (more advanced compression schemes may include intra- and inter-frame block prediction to further the codec performance).

The DCT enjoyed widespread acceptance in image coding because it has the desirable property that it tends to cluster the perceptually most meaningful transform coefficients (i.e., to compact the energy of the signal) in the top-left part of the transform coefficients matrix, enabling efficient compression schemes such as non-uniform quantization, zig-zag coefficient scanning and entropy coding thereof. Clearly, the actual ability of the DCT to compact the energy in the signal depends on the semantics of the particular image block which is encoded. Homogeneous blocks (e.g., blocks representing the smooth surface of an object) are desirable, because they yield transform coefficient matrices with few significant coefficients, hence simple to encode, and do not yield reconstruction artifacts when recovered by the decoder. Conversely, blocks which contain discontinuities (e.g., the juncture between objects of different colors, text, etc.) result in matrices of transform coefficients where the significant coefficients are not constrained to an area of the matrix and which may yield significant reconstruction artifacts at the moment of their decoding.

Albeit most modern coding technologies address somehow this issue by adapting the size of each block to the characteristics of the image, the predefined square shape of the blocks represents one of the DCT biggest limits, as some discontinuity will be likely to be present in the blocks, yielding reconstruction artifacts in the decoded image as shown in FIG. 13.

The present invention overcomes this limit of block-based image coding via a totally different approach known as graph-based transform.

The graph-based transform can be seen as a generalization of the block-based transform (or, conversely, the block based transform can be considered a special case of the graph-based transform). The image (or subset thereof) can be represented as a graph of nodes connected by weighted edges: each node is a pixel of the image and each weighted edge between two nodes describes the similarity between the pixels (for example, in the grayscale color space). For example, two pixels belonging to the same smooth region corresponding to the inner of the surface of an object will be similar and hence will be connected in the graph by an edge which has a high weight. Conversely, two pixels belonging to different objects will be likely to be dissimilar (or, equivalently, not similar) and will be connected in the graph by an edge bearing a low weight. Typically, for the purpose of image compression considered in this invention, each pixel of the image will be connected only to a subset of the other pixels in the image (typically, the four top, left, bottom and right adjacent pixels) and thus the corresponding edges will have a non-null weight. Conversely, each pixel will be disconnected from all the other pixels in the image, and hence the corresponding edge weight can conventionally be set to 0, since the similarity or dissimilarity with respect to those pixels is undefined in an embodiment of the invention.

One of the edges of the graph transform is that it can be applied to areas of the image of arbitrary shape and extension which can be then independently coded and decoded.

Having illustrated how an image can be represented as a graph where the nodes are the pixels and the edges connecting the nodes are weighted as a function of the similarity between pixels, the typical architecture of a graph-based image encoding-decoding architecture is illustrated in FIG. 1 in terms of its basic functional units. For simplicity sake, let the image f (or a block thereof) be composed of N pixels. For example, let f be a block of N=32×32=1024 pixels, so that each pixel of the block is indexed as $\{f_1, \ldots, f_N\}$ for example in raster-scan order (i.e., in rows-first order). It follows that f can be represented by the so-called weights matrix W, which is a N×N matrix where each element $w_{i,j}$ represents the similarity between $f_i$ and $f_j$. The characteristics of W are a major driver of the rate-distortion characteristics of any graph-based image coding scheme. Therefore, the object of the present invention is a method for subdividing the image in blocks, such that the weights matrix W of each block f has characteristics desirable for image compression purposes.

FIG. 1 illustrates a reference image encoder and decoder pair, according to the state of the art, based on the graph transform applied to square image blocks which is instrumental in understanding the issue with the transmission or memorization of the weights matrix W.

The encoder device 150 is composed, at least, of a weights graph generation unit 100, a graph Laplacian unit 110 and a graph transform unit 120, as represented in the upper part of FIG. 1.

The weights graph generation unit 100 takes in input an N-pixels image f or a block thereof and generates the N×N weights matrix W which is computed as follows. Let $d_{i,j}$ be a measure of the distance in the grayscale space between the i-th pixel $f_i$ and the j-th pixel $f_j$ of the image f, e.g., $d_{i,j}$ can be computed as the absolute difference between the values of the pixels $f_i$ and $f_j$:

$$d_{i,j}=|f_i-f_j|$$

Furthermore, it is assumed that each element of the weights matrix W* is computed by means of the following formula:

$$w_{i,j} = \frac{1}{1+d_{i,j}} \quad (1)$$

$$i \in N \wedge 0 \leq i < N$$
$$j \in N \wedge 0 \leq j < N$$

It turns out that the value of the weight of the graph arc connecting pixels $f_i$ and $f_j$, i.e., $w_{i,j}$, will be close to 1 ("high"

arc weight) if $f_i$ and $f_j$ are similar pixels, whereas the $w_{i,j}$ will be close to 0 ("low" arc weight) if $f_i$ and $f_j$ are dissimilar.

The graph Laplacian unit 110 generates the transform matrix U taking as input the weights matrix W*. This unit is configured for reading W* and computing a diagonal matrix E having N×N dimensions such that the i-th element of its diagonal is equal to the sum of all the weights of all the arcs incident into the i-th pixel as described in W*; hence, E is defined in matrix notation as shown in the following:

$$E = \mathrm{diag}(W^* \cdot V1)$$

$$V1 \in R^{N,1} \wedge (\forall x \in N, 1 \le x \le N | V_{x,1} = 1)$$

After having computed at least part of the diagonal matrix E, the unit computes the matrix L (having N×N dimensions), as the difference between the diagonal matrix E and the weights matrix W*, i.e., matrix L is the Laplacian of W*. This computation step is summarized in matrix notation as shown below.

$$L = E - W^*$$

Finally, the unit computes the N×N matrix U known as graph transform matrix or simply transform matrix, wherein the rows of U are the eigenvectors of L, i.e., the rows of U are the vectors that allow to diagonalize L.

The graph transform unit 120 takes as input the image f (which is considered as a vector having N×1) and the transform matrix U, and computes the N×1 coefficients vector f^ via the matrix multiplication $$\hat{f} = U \cdot f$$

The encoder then transmits the transform matrix U (or, alternatively, the weights matrix W* from which U can be computed) and the coefficients vector f^ to the receiver node over a bandwidth constrained channel or memorizes them on a memory support for later use, e.g., for decoding purposes.

The decoder 170 includes, at least, a graph Laplacian unit 110 and inverse graph transform unit 180 configured for reading, from a storage device or through a communication channel, both the weights matrix W and the coefficients vector f^. For sake of simplicity, we assume that both W* and f^ available to the decoders 170 are identical to those generated by the encoders 150, since in practical applications adequate measures are taken for minimizing read/write or channel errors occurring during information transfer from the encoder to the decoder.

The graph Laplacian unit 110, which is functionally analogous to the counterpart found at the transmitter side, takes in input the weights matrix W* and generates the transform matrix U as described above for the encoder counterpart.

The inverse graph transform unit 180 takes U and f^ as inputs and recovers the original image f. In order to perform this task, the unit 180 internally inverts the matrix U by generating the N×N inverted transform matrix $U^{-1}$, which is, in the present case, equal to the transposed matrix $U^T$, since U is composed by the eigenvectors of the Laplacian matrix of W'; after that, the unit recovers the original image f via the following matrix multiplication:

$$f = U^{-1} \cdot \hat{f}$$

The performance of the above graph transform based image coding and decoding scheme, both in terms of image quality and coding rate, is correlated with the characteristics of image f or the characteristics of the blocks into which the image is subdivided. In the simplest case, the image is encoded as a whole as a single block f which encompasses all the pixels in the image. Because typical natural images are likely to contain various elements with different textures, the corresponding weights matrix W will have many non-null elements whereas the corresponding transform matrix f^ will show a lot of high frequency components different from zero. That will drive up the coding rate and yield reconstruction artifacts at the decoder, which is obviously unwanted.

In a more practical case, the graph transform can be applied to blocks of the image, which are independently coded and decoded. For example, the graph transform could be applied to blocks of fixed square size as in other JPEG/MPEG coding standards. While this approach has the advantage of being well understood and simple to implements, it incurs in the same problem with JPEG/MPEG codecs, i.e., it is likely that the square block are crossed by discontinuities.

Hence, it is of the utmost importance that the image is subdivided in coding areas such that the discontinuities are left outside such areas. Clearly, if the coding areas are of fixed size (e.g., square), it is unavoidable that some discontinuities will be found in each block, with the undesirable effects discussed above. Another issue with the reference architecture depicted in FIG. 1 is the need to convey the weights matrix W to the decoder and the associated bitrate. Since the weights matrix represents the similarity between pixels, non-homogeneous coding areas will yield non-sparse weight matrices, which require more bits for their encoding even assuming that predictive encoding schemes are employed to represent the matrix values.

The present invention hence discloses, among others, a method and system, to subdivide the image to code in optimal coding areas, so that the graph transform can be independently applied to each coding area, where each coding area encompasses no or few discontinuities, avoiding the issues with square-sized coding areas.

Description of Prior Art

The Discrete Cosine Transform (DCT) is the most common transform used for block-based image and video compression (see K. Sayood, Introduction to data compression, Newnes, 2012); indeed, the DCT is at the basis of popular video coding standards such as MPEG-2 (used, for example, for terrestrial and satellite standard definition video broadcasting and in the DVD storage format), H.264/AVC (used for high-definition video broadcasting, streaming over IP networks and in Blu-Ray discs) and in the recently standardized H.265/HEVC (expected to replace H.264/AVC in the above-mentioned scenarios).

One of the main drawbacks of the DCT is that when a block contains edges that are not horizontal or vertical, the resulting transform coefficients are not sparse and the high-frequency coefficients can have large magnitude. This leads to higher bitrate or reconstruction artifacts around the edges. Recently, the graph-based approach has been proposed, according to which high-dimensional data naturally reside on the vertices of graphs and they can be visualized as a finite collection of samples defined as graph signals, with one sample at each vertex of the graph (D. I. Shuman, S. K. Narang, P. Frossard, A. Ortega, and P. Vandergheynst, "The emerging field of signal processing on graphs: Extending high-dimensional data analysis to networks and other irregular domains," Signal Processing Magazine, IEEE, vol. 30, no. 3, pp. 83-98, 2013). In the last years, researchers have studied how to apply classical signal processing techniques in the graph domain. Techniques for filtering, translation, modulation and downsampling in the graph domain have been developed. Several graph transforms have also been proposed, such as the graph Fourier transform (G. Taubin, "A signal processing approach to fair surface design", in Proceedings of the 22nd annual conference on Computer graphics and interactive techniques, ACM, 1995, pp. 351-358).

In general, while graph-transforms have been shown to be more efficient than conventional block-based transforms, the overhead of graph transmission may easily outweigh the coding efficiency benefits. Therefore, it is very important to design graph representations and corresponding graph transforms that are efficient also when graph has to be transferred to a decoder.

Sandryhaila et al. in "Nearest-neighbor image model", published in ICIP 2012 proceedings, propose to represent an image as a graph of nodes and arcs, where the arcs weights are determined so as to minimize the expected distortion at the receiver. However, such work does not teach how to compress the weights graph, by making difficult to apply this technique in a real-world environment.

In U.S. patent application no. US 2011/206288 A1, Ortega et al. describe an image encoding and decoding system using graph based pixel prediction. This document teaches how to encode and decode pictures through a predictor selection, but it does not teach how to compress the weights graph, by making difficult to apply this technique in a real-world environment.

Kim, Narang and Ortega in "Graph based transforms for depth video coding", published in ICASSP 2012 proceedings, propose to find the optimal adjacency matrix and compress it using context-based adaptive binary arithmetic coding following a fixed order; however, also their work does not teaches how to compress the weights graph, by making difficult to apply this technique in a real-world environment.

Narang, Chao and Ortega in "Critically sampled graph-based wavelet transforms for image coding", published in APSIPA 2013 proceedings, propose to encode the image as a binary unweighted graph and encode it using JBIG of size $(2N-1)\times(N-1)$, where N is the number of pixels in the original image. This encoding scheme produces images having an high level of encoding noise, since the binary unweighted graph limits the quantity of information that can be encoded. Moreover, the present invention exploits inter-pixel prediction to further the compression ratio which enables a twofold reduction of the image coding rate over the approach proposed by Ortega.

SUMMARY OF THE INVENTION

The present invention aims at solving these and other problems by providing a method and an apparatus for subdividing an image in homogeneous coding areas of arbitrary shape such that each area is simple to encode enabling a bandwidth-efficient graph-based representation.

The basic idea of the present invention is described below.

First, the image is segmented in homogeneous areas called "superpixels" using existing techniques for image segmentation; the ideal segmentation technique is such that the returned segments adhere precisely to the image discontinuities and encompass few image discontinuities. The pixels belonging to the superpixels form a connected region of arbitrary shape of the input image; the belonging and position of the pixels to a certain superpixel and the position of the superpixels within the image is represented in form of specific border or shape information.

Second, the located segments are iteratively clustered into larger superpixels until a certain predetermined requirement is met on the resulting superpixel set; this can be for example an image encoding target bitrate or optimum rate-distortion tradeoff. The superpixel size and number drives in fact the tradeoff between accuracy of the segmentation and overall rate required to encode the segment in terms of transform coefficients rate. Another requirement can be related to the overall number of superpixels or, equivalently, to their average pixel number deemed to be optimal.

Third, the Graph Fourier Transform (GFT) is carried out individually and independently on each superpixel of the set, in a piece-wise way.

As a consequence of this way to encode the image, the shape of the superpixels is conveyed in some encoded form to the decoding unit instead of the weights matrix as from the reference architecture in FIG. 1 together with the superpixel transform coefficients (compare it with FIG. 2). In fact the superpixels are homogeneous internally, thus their corresponding weights matrix can be approximated by a constant value, which allows to convey to the decoder the superpixel shape, for example in the form of a border, rather than the full weights matrix as for the reference architecture in FIG. 1. Furthermore, the superpixel border can be encoded as a black and white image, which can be compressed with existing methods for monochrome image compression for further coding efficiency. Also, most superpixels, being homogeneous, yield transform coefficients that are likely close to zero for the high frequencies, contributing to reduce the overall coding bitrate necessary for storing the image or transmit it on a channel.

At the decoding side, first the partition information of the image into superpixel is acquired together with their GFT-transformed coefficients. Second, each superpixel is inversely graph Fourier transformed, individually and independently, from the frequency domain to the space domain basing on the acquired GFT coefficients; third, the original image is reassembled by placing the reconstructed pixels of the superpixels in their original position on the basis of the relevant partition information mapping the pixels of the superpixels to their position within the image.

BRIEF DESCRIPTION OF DRAWING

The characteristics and other advantages of the present invention will become apparent from the description of an embodiment illustrated in the appended drawings, provided purely by way of non limiting example, in which:

In FIG. 8(a), the reference pixel (black) is located at the center of the image and is considered to have 4 adjacencies on top, left, bottom and right (dark grey); the remaining 4 pixels are not considered adjacencies of the reference pixel (light gray). In FIG. 8(b), the reference pixel (black) is located on an edge of the image and has 3 adjacencies on top, bottom and right (dark grey); the remaining 5 pixels are not considered adjacencies of the reference pixel (light gray). In FIG. 8(c), the reference pixel (black) is located at a corner of the image and has 2 adjacencies on bottom and right (dark grey); the remaining 6 pixels are not considered adjacencies of the reference pixel (light gray).

FIG. 12(a) illustrates an encoding apparatus 1100 suitable for carrying on the coding process corresponding to FIG. 2(a). Similarly, FIG. 12(b) illustrates a decoding apparatus suitable for carrying on the decoding process corresponding to FIG. 2(b).

FIG. 14 depicts: in (a) the entire image of which FIG. 13 is a zoomed portion; in (b) a comparison of the rate-distortion curves for when said image is encoded and decoded according to the present invention compared to a standard 8×8 DCT based compression technique.

DETAILED DESCRIPTION OF THE INVENTION

In the following, we provide a detailed description of the superpixel-based image encoding and decoding method and system which is the object of the present invention. For the purpose of providing a schematic description of the invention, first the encoder side is described, next the decoder side is described as well.

Encoding

Figure 4:
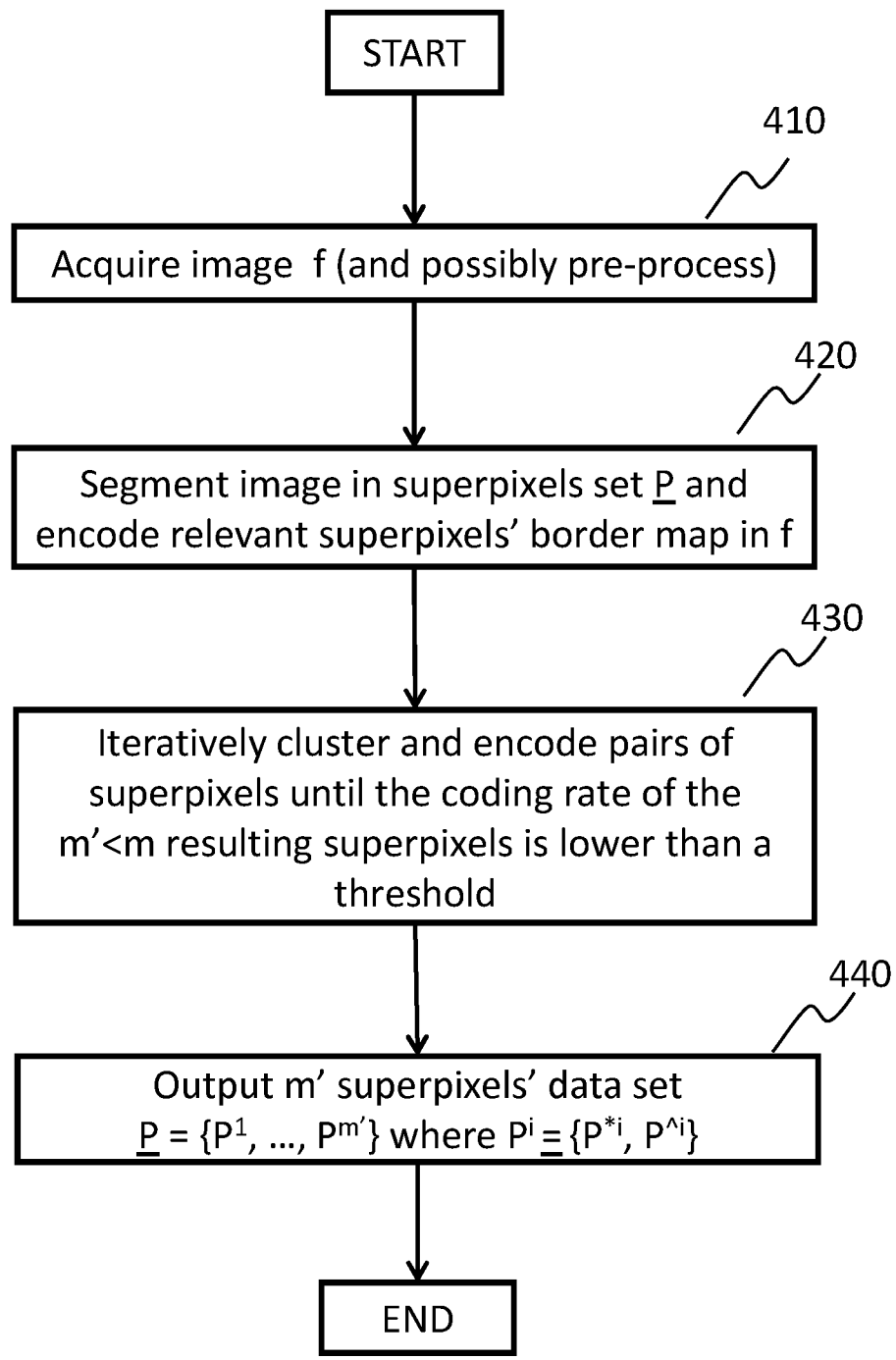
FIG. 4 shows a flow chart exemplifying an embodiment of the encoding technique in its entirety according to the invention.

FIG. 4 provides a high-level, conceptual view of an encoding process carried on according to the present invention. First, the image is acquired, for example, from a camera or as an uncompressed image file, and pre-processed to meet the encoder requirements (step 410). Possible forms of preprocessing include image resizing, filtering and decomposition of RGB images into combinations of such channels into YUV components.

Next, at step 420 the image is segmented in pixel areas which are homogeneous by content (called "superpixels" in the following) using some method for image segmentation. Whereas several image segmentation algorithms are described in the literature, the performance of the image encoding and decoding method described herein is substantially agnostic of the particular image segmentation scheme employed as actual coding experiments revealed.

At this point (step 430), each superpixel can be potentially encoded via the graph transform due to its ability to be applied to arbitrarily-shaped image areas. Since the superpixel segmentation leaves the discontinuities between the superpixel borders, the superpixels recovered at the decoder are less likely to show reconstruction artifacts. However, prior to graph-encoding the superpixels, they are iteratively clustered to strike a more favorable tradeoff between the rate required to represent the superpixel borders, the superpixel transform coefficients and possibly the encoding distortion, which depend on the number and area of the superpixels.

Eventually, at step 440, the resulting encoded superpixel data set P are outputted in form of a set of GFT transformed superpixels P^i and relevant shape representation preferably in compressed/encoded form P*i; such data set can be memorized for later reading by a decoding apparatus or sent to it through a communication channel.

In the following, we detail an embodiment of the present invention where the superpixels are iteratively clustered and encoded until some target encoding rate is obtained, which enables to practically apply the present invention to the common scenario of communications over bandwidth-constrained channels or capacity-constrained media.

Image Segmentation

The image is initially segmented for the purpose of obtaining a preliminary subdivision of the image in groups of pixel (also called "superpixels" in the technical literature) which are similar in color or other low-level properties derived from the pixel values themselves (luminance component Y, chrominance components U or V, R G or B components, and so on) and hence encompass negligible or no discontinuities between the pixels pertaining to a group, so that the human beings tend to perceive that pixel group like a sort of single, merged big pixel, helping the individual to recognize the objects present in any real or artificial image. In other words, they are considered so similar that the processing of the image, like encoding and decoding can be effected with high efficiency if certain techniques are used, like the graph transforms for images (or videos).

Partitioning an image within superpixels is a well-known problem in the related literature which finds several practical applications. For example, one may want to separate a foreground object over a background image. Image segmentation algorithms enable to determine which pixels in an image belong to semantically affine regions, locating the boundaries which separate the regions.

As shown in FIG. 3b, superpixels are perceptually meaningful atomic regions which aim to replace a rigid pixel grid. Several different algorithms for image segmentation exist in the literature, for example: NC—Superpixels from Normalized Cuts (X. Ren, J. Malik. *Learning a classification model for segmentation*. International Conference on Computer Vision, pages 10-17, 2003); FH—Felzenswalb & Huttenlocher (P. F. Felzenswalb, D. P. Huttenlocher. *Efficient graph-based image segmentation*. International Journal of Computer Vision, 59(2), 2004); TP—Turbopixels (A. Levinshtein, A. Stere, K. N. Kutulakos, D. J. Fleet, S. J. Dickinson, K. Siddiqi. *TurboPixels: Fast superpixels using geometric flows*. Transactions on Pattern Analysis and Machine Intelligence, 31(12):2290-2297, 2009); ERS—Entropy Rate Superpixels (M. Y. Lui, O. Tuzel, S. Ramalingam, R. Chellappa. *Entropy rate superpixel segmentation*. Conference on Computer Vision and Pattern Recognition, pages 2097-2104, 2011); SEEDS—Superpixels Extracted via Energy-Driven Sampling (M. van den Bergh, X. Boix, G. Roig, B. de Capitani, L. van Gool. *SEEDS: Superpixels extracted via energy-driven sampling*. European Conference on Computer Vision, pages 13-26, 2012); CRS—Contour Relaxed Superpixels (C. Conrad, M. Mertz, R. Mester. *Contour-relaxed superpixels*. Energy Minimization Methods in Computer Vision and Pattern Recognition, volume 8081 of Lecture Notes in Computer Science, pages 280-293, 2013).

Such various partitioning techniques differ not only by complexity, which affects the segmentation time and the overall coding time, but also by the output, i.e., different image segmentation algorithms are expected to yield different segmentations of the same image. Our experiments with different segmentation algorithms showed that the SLIC (Radhakrishna Achanta, Appu Shaji, Kevin Smith, Aurelien Lucchi, Pascal Fua, and Sabine Süsstrunk, "*SLIC Superpixels*", EPFL Technical Report no. 149300, June 2010) algorithm yields the best performance image coding wise.

In particular, the SLIC algorithm yields superpixels which stick to the image discontinuity. Our coding experiments showed that when the graph transform is applied to superpixels generated using the SLIC algorithm, few high frequency coefficients are produced by the graph transform. Given the desired number of approximately equally sized superpixels (k), the SLIC algorithm performs an initial segmentation of an image, identifying a number of k regular grid spaced pixel called cluster centroid (Ck). For each pixel, located into an area surrounding a given cluster centroid, a measure of similarity respect to the cluster centroid is given. The size of the area of the image surrounding the given cluster centroid is related to the number of superpixels (k). The mentioned measure of similarity among pixels in the area surrounding a given cluster centroid, is performed employing a metric function given by the following relations:

$$c_{ij} = \sqrt{(l_i - l_j)^2 + (a_i - a_j)^2 + (b_i - b_j)^2},$$

$$s_{ij} = \sqrt{(x_i - x_j)^2 + (y_i - y_j)^2},$$

$$d_{ij} = \sqrt{\left(\frac{c_{ij}}{N_c}\right)^2 + \left(\frac{s_{ij}}{N_s}\right)^2}.$$

where i and j are the pixel indices on which the similarity measure is evaluated and $N_c, N_s$ are normalizing constants. The above metric function takes in to account both the color information of the pixels represented by the values of the CIELAB color space (l,a,b) and the coordinate information (x,y) for each pixel located into the above mentioned area. Once each pixel has been associated to the nearest cluster center on the basis of its metric values (e.g., each pixel is associated to the nearest cluster center if the value of the similarity metric is above a threshold value), an update step adjusts the cluster centers to be the mean of all the pixels belonging to the cluster area. The L2-norm is used to compute a residual error between the new cluster center locations and previous cluster center locations. The assignment and update steps are repeated iteratively until the error converges.

FIG. 3(a) shows a sample natural image with lots of details: the image is subdivided in semantically homogeneous areas which are similar (e.g.: the texture of the flowers, the marble round the window, etc.). FIG. 3(b) shows the output of the SLIC algorithm over the above image: the algorithm returns a large number of small superpixel which adhere to the borders of the object in the picture. Therefore, in a possible embodiment of the present invention, the image to be encoded is initially segmented in superpixels using the SLIC algorithm.

Figure 9:
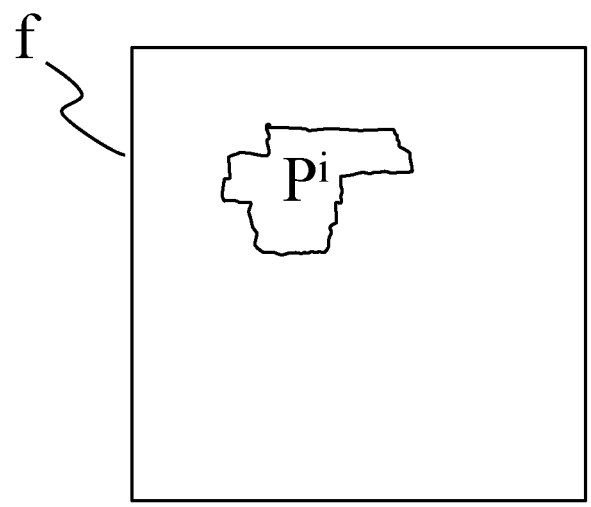
FIG. 9 shows two possible ways to represent the shape of a certain superpixel Pi in terms of superpixels belonging to it (a) or of its border pixels (b).
Figure 9:
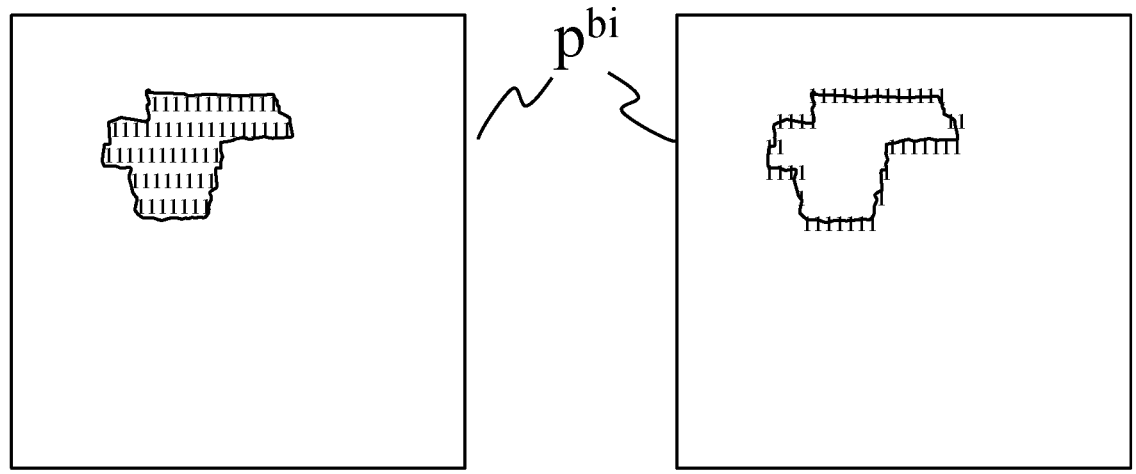

In detail, we assume that the image is segmented into m superpixels $\underline{P}=\{P^1, \ldots, P^m\}$. In the following, for the sake of clearness and accessibility of the exposition, we assume that the shape of the generic i-th superpixel $P^i$ is represented as a black and white image $P^{bi}$, for example of the same size of the original image to be encoded, where each pixels is encoded over 1 bit and can be represented on the screen of a display apparatus with black if it belongs to $P^i$, and white otherwise (see in particular FIG. 9(b), left).

Of course numerous techniques are possible for indicating which pixels of the image f belongs to a certain superpixel, i.e., to represent the shape or borders of a superpixel $P^i$ of the pool. For example, alternatively the border pixels of a superpixel can be set to "1", while all other pixels of the image assume the value "0" (see FIG. 9(b) right).

Iterative Superpixel Clustering

The superpixels obtained via image segmentation are then clustered into progressively larger superpixels on the basis of clustering information in order to strike a more favorable tradeoff between the rate required to encode the superpixel borders, i.e., the superpixel geometry, and the rate required to encode the superpixel transform coefficients, i.e., the superpixel textures. One among several image segmentation algorithms, including the SLIC algorithm exemplarily considered in this embodiment, can be used to segment the image in highly homogeneous superpixels by subdividing the image in a large number of relatively small superpixels, as FIG. 3(b) clearly shows. Intuitively, small superpixels are less likely to include discontinuities because adhere better to the discontinuities, hence the lower bitrate required to encode the (fewer) high-frequency transform coefficients and thus the fewer reconstruction artifacts at the decoder side. However, it is intuitive that the more the superpixels in the image, the more border information must be conveyed to the decoder at the price of increasing superpixel border coding rate. In an embodiment of the present invention described in the following, we iteratively cluster pairs of superpixels into progressively larger superpixels until a target overall image coding rate is achieved.

First the encoding rate necessary for encoding the image as partitioned by segmentation algorithm is calculated in an embodiment of the invention.

Figure 5:
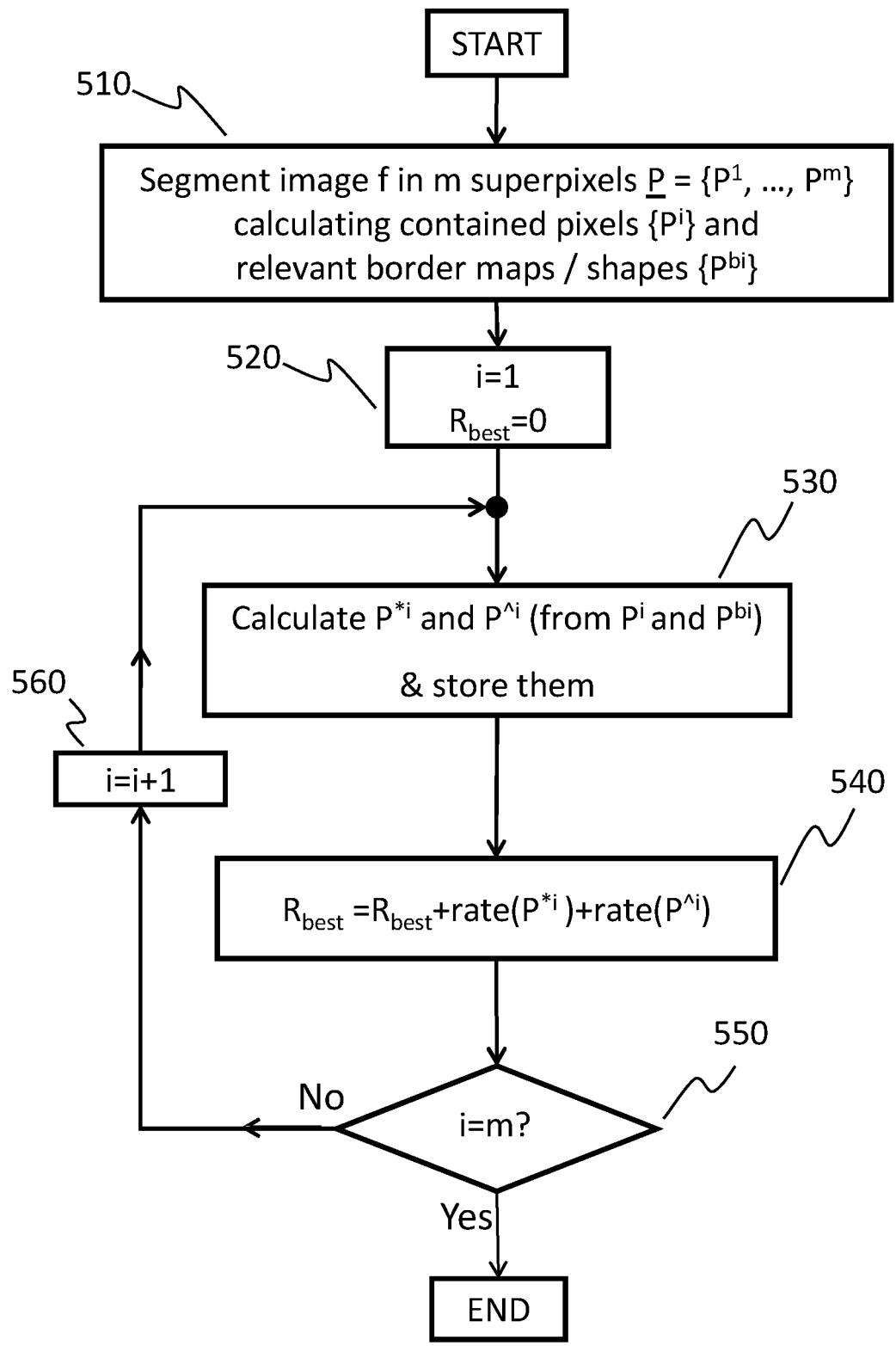
FIG. 5 is a flow chart illustrating an embodiment of the initial image segmentation and coding of the resulting superpixels described herein. Namely, in the considered embodiment, each superpixel border and texture generated by the segmentation is independently encoded. Such set of superpixels is indicated as P and initially represents the best available solution.

In particular the flowchart in FIG. 5 illustrates an algorithm that calculates the rate necessary for encoding/compressing the image according to the invention on the basis the segmentation produced by the segmentation algorithm, like e.g., SLIC, carried out at step 510. Let $\underline{P}$ indicate the pool of superpixels forming the initial candidate for being encoded via individual Graph Fourier Transform, which corresponds to the set of the m superpixels' output generated by such image segmentation algorithm, i.e., $\underline{P}=\{P^1, \ldots, P^m\}$. More precisely, each superpixel is individuated by its shape, represented in some way as $P^{bi}$, and its constituting pixels $P^i$ in the space domain. Preferably, the shape representation of the superpixels are compressed (i.e., encoded) in order to reduce the bit rate necessary for their memorization or transmission according to any known lossless image compression/encoding technique, like e.g., JBIG (Joint Bi-level Image Experts Group).

The resulting compressed shape representations are indicated as $P^*=\{P^{*1}, \ldots, P^{*m}\}$. At step 520 the superpixel counter and index i is initialized to 1 and the variable $R_{best}$ which here accumulates the value of the rate necessary for encoding the image according to the initial segmentation in the m superpixels; of course it is initialized to zero.

At step 530 the individual GFT of the i-th superpixel $P^{\wedge i}$ is calculated on the basis of the pixel values of the superpixel $P^i$, and the relevant shape representation $P^{bi}$ is preferably compressed in order to obtain the encoded superpixel border $P^{*i}$. Both entities $P^{\wedge i}$ and $P^{*i}$ are stored since they are necessary for the iterative encoding and transforming technique according to an embodiment of the invention which is carried out after the initial phase of the calculating the encoding rate necessary for coding the image according to the initial segmentation $\underline{P}$.

The encoding cost rate $R_{best}$ is then updated at step 540 by adding the encoding rate of the current superpixel $P^i$ to its previous value as from the formula below:

$$R_{best}=R_{best}+\text{rate}(P^{*i})+\text{rate}(P^{\wedge i})$$

where rate ($P^{*i}$) indicates the rate of the (possibly encoded) border and rate ($P^{\wedge i}$) indicates the rate of the (possibly encoded) GFT coefficients of superpixel $P^i$. In case the shape representations $P^{bi}$ have not been compressed, the rate of $P^{bi}$ can be used in the formula above instead of that of $P^{*i}$.

At this point, the verification step 550 checks whether the last (m-th) superpixel of the initial segmentation has been processed. If so (i=m), the procedure ends, otherwise the superpixel index i is incremented by 1 at step 560 and the initial rate calculation procedure continues with step 530 until the rate of all superpixel has been added to the variable $R_{best}$ and the GFT coefficients $P^{\wedge i}$ as well as the encoded superpixels' shapes $P^{*i}$ of all superpixels has been calculated and stored.

Figure 6:
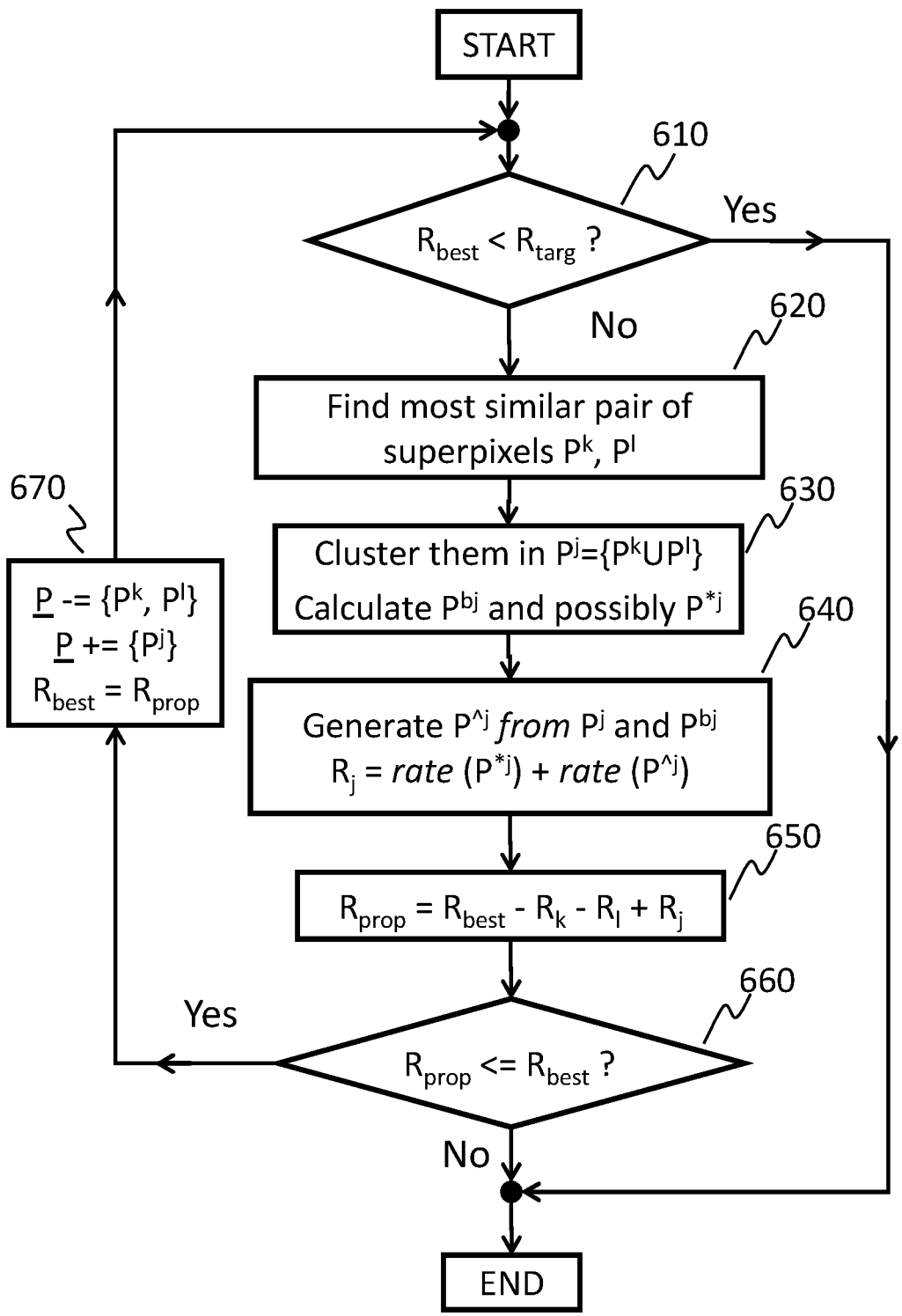
FIG. 6 is a flow chart illustrating an embodiment of the iterative superpixel clustering described herein which follows the initial segmentation and coding. Namely, in the considered embodiment, pairs of superpixels are iteratively aggregated until an overall target bitrate over the whole image is reached.

As previously explained in general the conventional segmentation algorithms do not yield optimal results from the encoding cost rate if an individual GFT transform is applied to each superpixel due to their excessive number that increments the overhead for encoding their shapes; hence in an embodiment of the invention an iterative clustering algorithm is applied to this initial segmentation as shown in FIG. 6.

Formally, as an overall result, the iterative clustering and encoding algorithm of FIG. 6 clusters the m initial superpixels into m' superpixels, where in general m'<=m, such that the aggregated coding rate of the m' superpixels via individual Graph Fourier Transform does not exceed some target rate $R_{targ}$.

First at step 610 the iterative procedure checks whether the rate produced by encoding the image according to the invention in the initial segmentation $R_{best}$ satisfies the predetermined criterion, which in an exemplary embodiment is the target encoding rate $R_{targ}$.

Next, as shown in FIG. 6 the algorithm checks if the rate of the best coding solution found so far $R_{best}$ is lower than the maximum target bitrate imposed to the encoder $R_{targ}$ (step 610): if that is the case, no further action is required to the encoder and the algorithm ends. Otherwise, the algorithm continues to reduce the coding rate by iteratively clustering a pair of two neighbor superpixels and encoding the resulting superpixel. Obviously, not represented in the figure, if the number of superpixels returned initially by the segmentation algorithm is equal to one, i.e., m=1, the clustering is not executed further and the procedure ends.

Otherwise, the algorithm compares all the pairs of neighbor superpixels and for each pair of adjacent superpixels it computes a measure of dissimilarity, clustering the pair of super pixel that are the most similar.

The similarity or the dissimilarity between arbitrary segments of an image can be computed via different metrics. In the embodiment of the present invention described herein, we exemplarily describe the use of the CIEDE2000 metric (G. Sharma, W. Wu, and E. N. Dalal, "The CIEDE2000 color difference formula: Implementation notes, supplementary test data, and mathematical observations", Color Research and Application, vol. 30, no. 1, pp. 21-30, 2005.)

The CIEDE2000 algorithm is typically applied to an area of an image and returns a scalar figure which represents the average color of such area. Let $P^{\wedge k}$ and $P^{\wedge l}$ be two neighbor superpixels, and let $M^{\wedge k}$ and $M^{\wedge l}$ be the relative CIEDE2000 metric. The dissimilarity between $P^{\wedge k}$ and $P^{\wedge l}$ is measured as $|M^{\wedge k}-M^{\wedge l}|$, and the algorithm measures such distance for each pair of neighbor superpixels. Eventually, the procedure returns the indices k,l of the two adjacent superpixels $P^{\wedge k},P^{\wedge l}$ that bear the smallest dissimilarity and are the best candidates for clustering because.

Next, at step 620 the procedure generates a novel superpixel $P^j$ which is produced by clustering the pixels composing the superpixels $P^k$ and $P^l$, i.e., $P^j=P^k \cup P^l$, where U denotes the Union operator. Of course the border pixels separating $P^k$ from $P^l$ become also part of the novel superpixel $P^j$ so that a new superpixel with a new shape $P^{bj}$ (and possibly $P^{*j}$) is produced.

In step 630 superpixel $P^j$ is then encoded independently via a graph Fourier transform as $\{P^{*j}, P^{\wedge j}\}$=encode ($P^j$), where $R_j$ represents the coding rate for generating $P^{\wedge j}$, i.e., $R_j=R(P^{*j})+R(P^{\wedge j})$ being $R(P^{*j})$ the cost rate for encoding in a compressed way the shape of the new superpixel $P^j$, while $R(P^{\wedge j})$ is the cost rate for encoding the pixels of the superpixel $P^j$, i.e., the cost for generating $P^{\wedge j}$ from $P^j$.

Once the superpixel $P^j$ has been encoded, the algorithm checks whether aggregating superpixels $P^{\wedge}k$ and $P^{\wedge}l$ into superpixel $P^{\wedge}j$ has enabled a rate reduction of the coded image or not. Let $R_{prop}$ be the coding rate of the proposed novel solution which consists in replacing superpixels $P^{\wedge k}$ and $P^{\wedge l}$ with $P^{\wedge j}$, which is computed as $R_{prop}=R_{best}-R_k-R_l+$ $R_j$ (step 650), where $R_{best}$ is the coding rate of the best solution found so far. At step 660 the procedure checks whether $R_{prop} < R_{best}$: if the condition is not met, then clustering superpixels $P^k$ and $P^l$ into $P^j$ does not yield any bitrate reduction (typically, due to an increase in the transform coefficients rate), so the solution found so far is hence optimal and the algorithm terminates.

Otherwise, clustering $P^{\wedge k}$ and $P^{\wedge l}$ into $P^{\wedge j}$ has reduced the image coding rate (typically, due to reduced border coding rate), and so the iterative clustering and encoding procedure removes from the pool of superpixels which represent the current best solution $\underline{P}$ the superpixels $P^{\wedge k}$ and $P^{\wedge l}$; at step 670 it replaces them with $P^{\wedge j}$ by removing $P^k$ and $P^l$ from $P$ ($\underline{P}-=\{P^k, P^l\}$) and adding $P^j$ to $P$ ($\underline{P}+=\{P^j\}$); finally it keeps track of the rate corresponding to the updated solution as $R_{best}=R_{prop}$.

Figure 3:
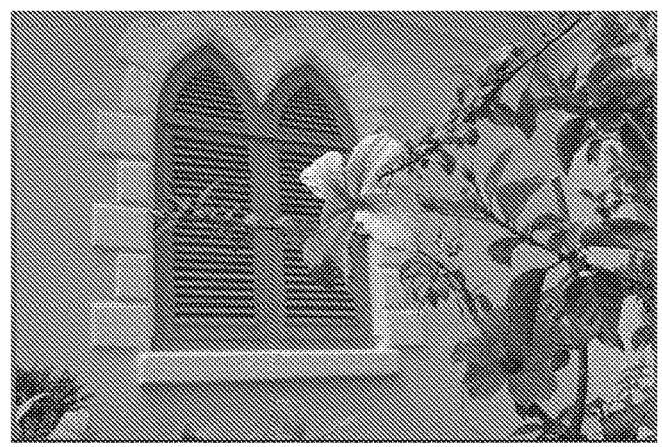
FIG. 3 shows (a) a sample natural image with several objects in the scene, (b) the superpixel map of the image as output of the SLIC image segmentation algorithm, (c) the improved superpixel map produced by the clustering algorithm illustrated in the present description.
Figure 3:
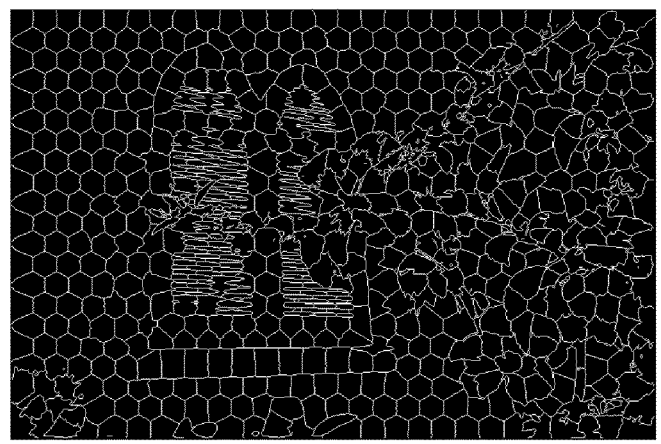
Figure 3:
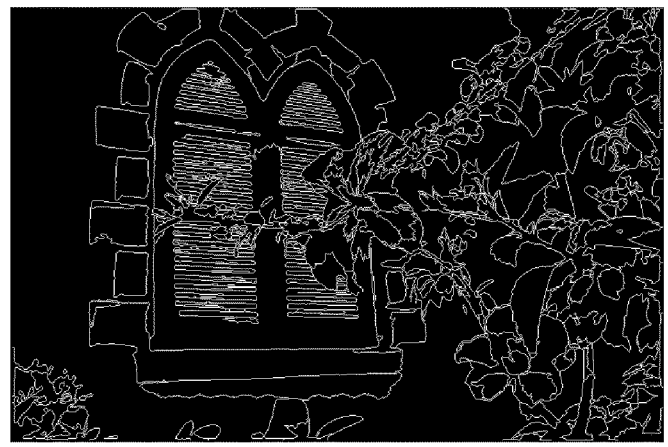

A comparison between FIGS. 3 (b) and (c) shows how the proposed algorithm operates on a real image as initially segmented by the SLIC algorithm. Notice how the wall in the building of the image in the figure (b) had originally been subdivided in an unneeded large number of small superpixel, despite the wall is a smooth homogenous area of the image that, for the purposes of image coding, should have better segmented into fewer larger superpixels instead. FIG. 3(c) shows the result of the iterative superpixel clustering algorithm described herein. The algorithm is able to group together small superpixels which are semantically similar and hence are not divided by discontinuities, thus reducing the border coding rate while not bloating the overall transform coefficients coding rate.

Encoding Process

Each superpixel $P^{\wedge i}$ is independently encoded from the other superpixels in the image as illustrated in FIG. 2(a) as the dashed box 210.

The superpixel encoder 210 takes in input two different elements.

The first input element to the superpixel encoder is for example represented by an array of N pixels P corresponding to the pixels (sometimes called texture) of the superpixel $P^i$ to be encoded; please note that for the sake of simplicity the index i has exceptionally not been put in the elements of this figure). Let, for example, each pixel be encoded over 8 bit and each pixel can assume any integer value between 0 and 255 shades of gray, so that each pixel is encoded over 1 byte. For example, FIG. 7(a) shows the case of a 3×3=9 pixels (N=9) area of the image in FIG. 3(a). Albeit different pixel indexing schemes are possible, we exemplarily index pixels in rows-first order, i.e., the pixels in the image are identified as $\{f_1, \ldots, f_9\}$ as shown in the figure. It follows that the pixels of the original image f to encode corresponding to the superpixel can be represented as a vector P of N bytes where each element of the vector represents a pixel following, for example, a raster-scan order.

The second input to the superpixel encoder apparatus is, in the proposed embodiment of the present invention, a black and white image $P^{bi}$ such as that shown in FIG. 7(b) which defines the pixels of the original image which belongs to the generic i-th superpixel to encode. Each pixel of $P^{bi}$ is encoded over 1 bit with, for example, the "1" value if part of the superpixel to be encoded (black pixels in FIG. 7(b)) whereas it is encoded with the "0" value if not part of the superpixel to be encoded.

The optional border (or shape) coding unit 230 takes in input the image representing superpixel border $P^{bi}$ and outputs a compressed representation of the superpixel border $P*^i$ in an embodiment of the present invention. Because the superpixel border is a black and white image, existing techniques for compression of black and white images, such as for example fax documents, apply. In the proposed embodiment, the superpixel border $P^{bi}$ is compressed using the JBIG scheme for compression of bi-level images (ISO/IEC standard 11544 and as ITU-T recommendation T.82).

The weights matrix W generation unit 250 takes in input the superpixel border $P^{bi}$ and outputs the relative binary weights matrix $W^i$ corresponding to the superpixel to be encoded.

Figure 7:
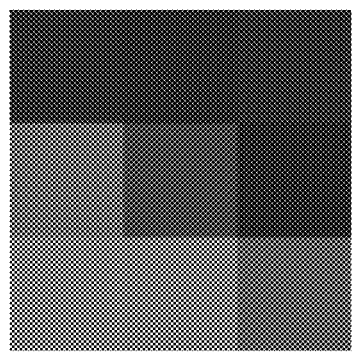
FIG. 7(a) shows a very simple image f composed by a grid of just 3×3 pixels crossed by a diagonal discontinuity that goes from the top-left to the right bottom corner.
FIG. 7(b) shows the pixels of the image numbered in raster-scan order from 1 to 9. Pixels 1, 2, 3, 5, 6, 9 belong to the same superpixel and are marked in black.
FIG. 7(c) shows the weights matrix W corresponding to the superpixel shown in FIG. 7(b) computed according to the scheme depicted in FIG. 11.
FIG. 7(d) shows the 6 pixels that compose the superpixel arranged in raster-scan order as a vector of 6 pixels.
Figure 7:
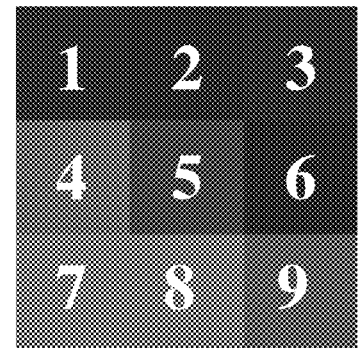
Figure 7:
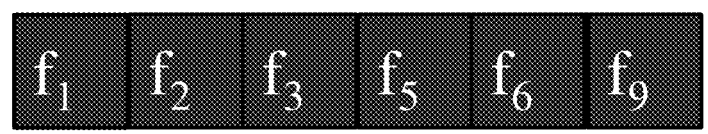

We recall that FIG. 7 shows a superpixel composed by the 6 pixels $\{f_1, f_2, f_3, f_3, f_5, f_6, f_9\}$. FIG. 7(c) shows the arcs weights matrix $W^i$ corresponding to the superpixel $P^i$: because the superpixel in our example is composed by 6 pixels, the size of the weights matrix W is equal to 6×6=36 elements. For each i-th pixel $f_i$ belonging to the superpixel, the weights matrix represents with $w^i_{i,j}$ the weight of the arc connecting $f_i$ with any other j-th pixel $f_j$ belonging to the superpixel. Namely, each element of W can be either 0 or 1 only, i.e., $w^i_{i,j}$ is either 0 or 1. If two pixels $f_i$ and $f_j$ belonging to the same superpixel are adjacent, then the weight $w^i_{i,j}$ of the arc connecting the two pixels is equal to 1, i.e., $w^i_{i,j}=1$. Otherwise, if two pixels $f_i$ and $f_j$ belong to the same superpixel but they are not adjacent, then we have $w^i_{i,j}=0$.

Figure 8:
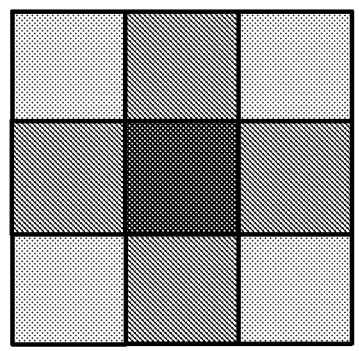
FIG. 8 shows three possible cases of pixel adjacency for a 3×3 pixel image.
Figure 8:
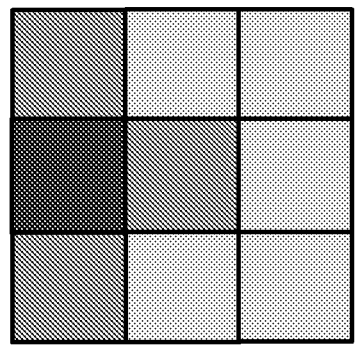
Figure 8:
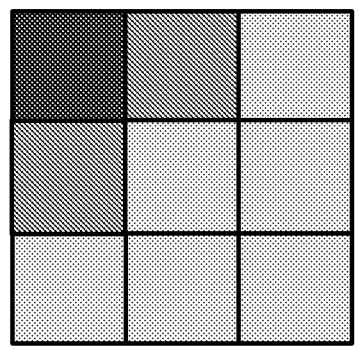

The concept of adjacency between pixels is defined as follows and is exemplified in FIG. 8, which represents a toy image composed of 9 pixels. A pixel $f_i$ is said to be adjacent to pixel $f_j$ if $f_j$ is located immediately above, or below, or to the right, or to the left of $f_i$. For example, in FIG. 8(a) the reference pixel is $f_5$ and is located in the middle of the image: the adjacencies of $f_5$ are the four pixels $f_2, f_4, f_6, f_8$. Notice that pixels $f_1, f_3, f_7, f_9$ are not adjacencies of $f_5$. Depending on the position of the reference pixel in the image the adjacencies may be fewer than 4. For example, in FIG. 8(b) the reference pixel is $f_4$ and is located on the left image border, thus its adjacencies are only 3 ($f_1, f_5, f_7$ namely). Finally, in FIG. 8(c) the reference pixel is $f_1$ and is located at the top-left image corner, thus its adjacencies are only 2 ($f_2, f_4$, namely).

Figure 11:
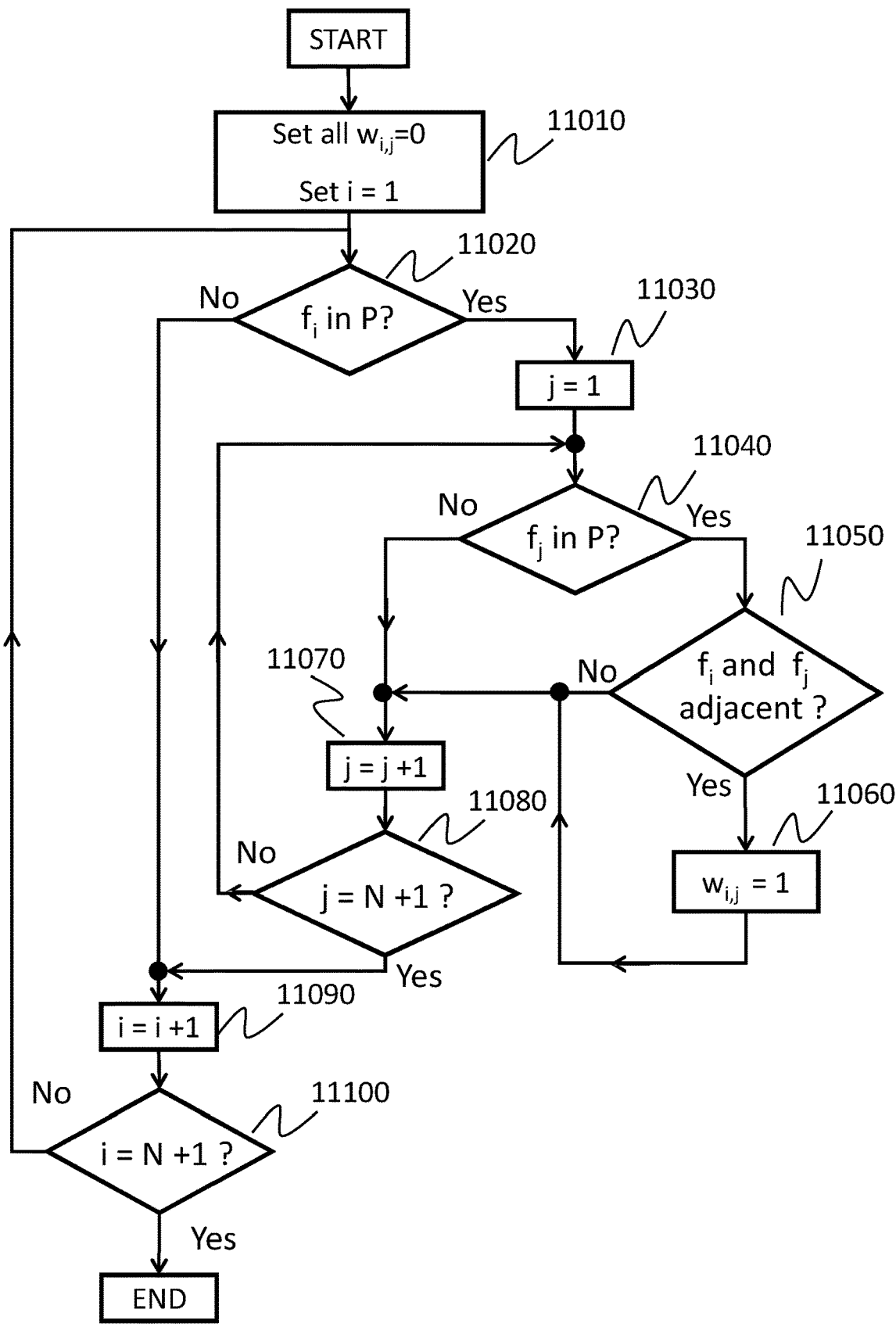
FIG. 11 is a flow chart which illustrates the recovery of the weights matrix W relative to the superpixel P composed of N pixels. Notice that since the superpixels are smooth, homogeneous areas of the image, the corresponding weights matrix can be approximated with a constant value, which in the figure is conventionally set to 1.

Having clarified the concept of adjacency between pixels, the method to generate the weights matrix W corresponding to a given superpixel border $P^b$ (also referred to as borders information) is described in FIG. 11 by means of a flow chart. Initially, all the elements of $W^i$ are set equal to 0 ($w^i_{i,j}=0$), while the pixel index i is initialized to 1 (step 11010). Next, at step 11020 for each pixel $f_i$ belonging to the superpixel (see cycles 11040-11070) the method checks whether each other pixel $f_j$ in the superpixel is adjacent to $f_i$ (step 11040): in the case, the corresponding weight $w^i_{i,j}$ is set to 1 (step 11060).

If the pixel $f_i$ does not belong to the current superpixel P (check 11020 gives "NO") the next pixel $f_{i+1}$ is processed by incrementing the pixel index (step 11090) and repeating the steps 11020-11090 until the last N-th pixel has been processed (check of step 11100); in this case the procedure regarding the generation of the weights matrix W of the generic superpixel P ends.

FIG. 7(a) exemplifies the case of an image f of size 3×3 pixels: The considered superpixel $P^1$ (i.e., the first one) encompasses the 6 pixels $\{1, 2, 3, 5, 6, 9\}$, which are represented in dark color in FIG. 7(b). Because the superpixel encompasses 6 pixels, the corresponding weights graph $W^1$ will be represented by a matrix of size 6×6 elements. FIG. 7(c) shows the corresponding weights matrix $W^1$: the matrix is symmetric and the diagonal of the matrix is equal to 0. Hence, in general the output of the weights matrix generation unit 105 is the N×N matrix $W^i$ where each element is the weight of the arc connecting two pixels, and the value of each element of $W^i$ is either "0" if the two pixels are not adjacent, and "1" otherwise.

The graph Laplacian unit 110 takes as input the weights matrix $W^i$ and outputs the N×N transform matrix $U^i$. From now on the index i will be neglected in the description and relevant formulas of the superpixel encoder 210, since it is clear that the calculations are related to a generic i-th superpixel and not the entire image or regular block thereof.

First, the unit computes the N×N diagonal matrix $\Delta$ from W such that the i-th element of its diagonal is equal to the sum of all the weights of all the edges incident into the i-th pixel as described in W'. Second, the unit computes the N×N matrix $L=\Delta-W'$, where L is the graph-Laplacian of W.

Third and finally, the unit computes the N×N matrix U known as transform matrix, where the rows of U are the eigenvectors of L, i.e., the rows of U are the vectors that allow to diagonalize L.

The graph transform unit 220 takes as input the N×N transform matrix U and the N×1 vector P which represents the pixels of the superpixel texture and outputs the transform coefficients vector $P^\wedge$. Vector P is composed of the pixels of the superpixel to code, indexed according to the same criteria used to generate the weights matrix W. For example, with reference again to FIG. 7(a) which shows the case of an image composed of 9 pixels, we consider the superpixel represented with dark gray pixels in FIG. 7(b). Such superpixel is composed by pixels number 1, 2, 3, 5, 6, 9, where the indexing accounts for a raster scan of the image. The vector P corresponding to the considered superpixel is shown in FIG. 7(d) and is represented by pixel numbers 1, 2, 3, 5, 6, 9 arranged in a vector. The unit computes the N×1 coefficients vector $P^\wedge$ via the matrix multiplication $$P^\wedge = UP,$$

where the coefficients vector $P^\wedge$ has size N×1.

The output of the encoder is hence composed by the (optionally compressed) superpixel border P* and the coefficients vector $P^\wedge$, which are sufficient to enable to recover the superpixel independently from all the other superpixels in the original image as detailed in the following.

Encoding Apparatus

Figure 12:
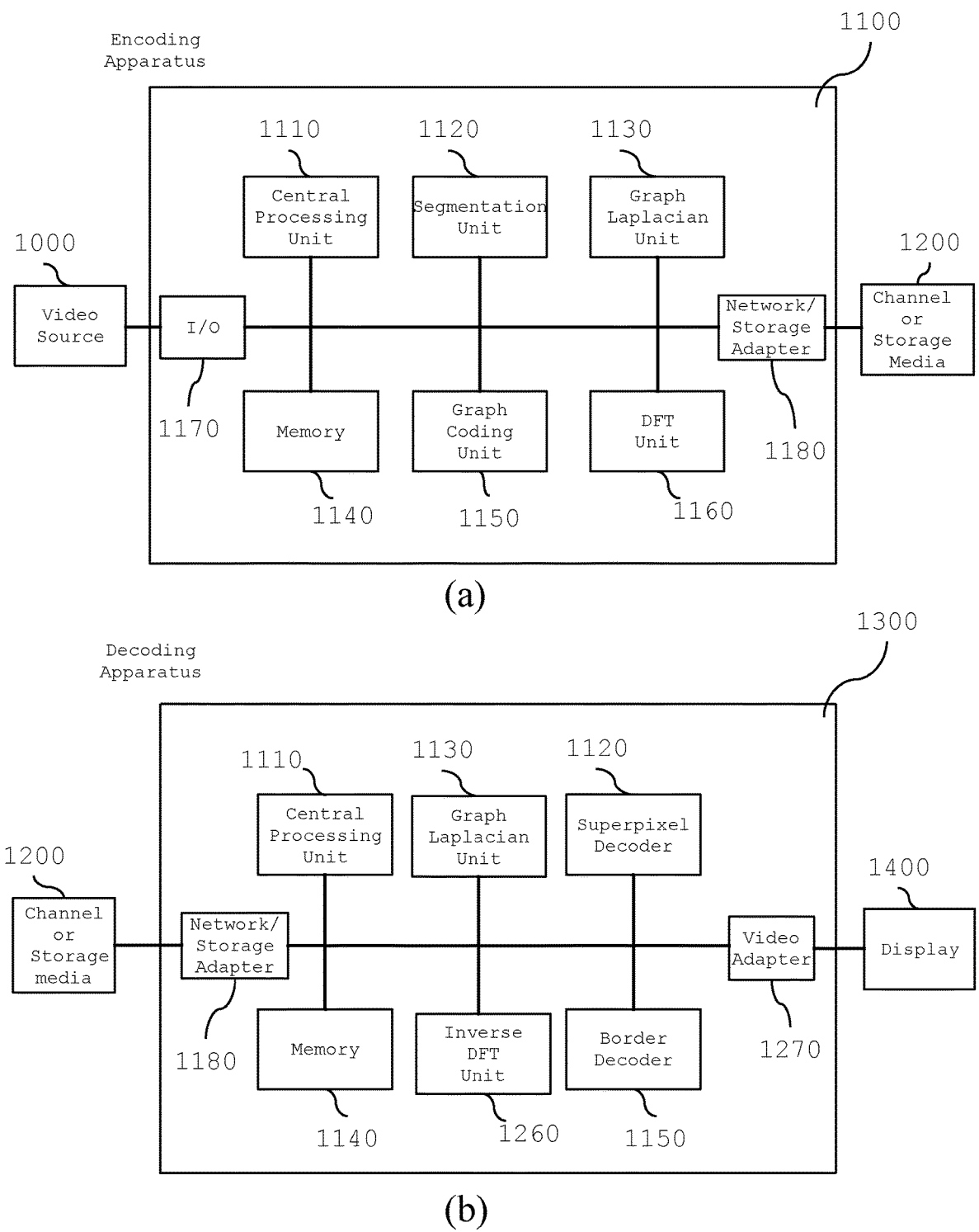
FIG. 12 illustrates an image encoding and decoding apparatus which embodies the present invention. Namely.

FIG. 12(a) illustrates an encoding apparatus 1100 suitable for carrying on the coding process corresponding to the scheme in FIG. 2(a) and detailed in the above. The video source 1000 can be either a provider of live images such as a camera, or a provider of stored contents such as a disk or other storage and memorization devices. The Central Processing Unit (CPU) 1110 takes care of activating the proper sequence of units required to encode the image. The CPU first fetches the image from the video source by means of input means 1170 (e.g., an USB, Firewire, SATA or Ethernet controller or the like), and loads it into the memory unit 1140. Next, the CPU activates the segmentation unit 1120, which fetches the original image f from the memory, executes a segmentation algorithm such as the SLIC algorithm, subdivides the image in m superpixels $\{P^1, \ldots, P^m\}$ and stores in memory the m black and white images corresponding to the m superpixels in an embodiment of the present invention.

Then the CPU executes the iterative clustering algorithm in FIG. 6, which iteratively clusters and encodes pairs of superpixels. At each iteration of the algorithm, the CPU locates the two most similar superpixels which is then encoded. The encoding of each single superpixel requires the activation, in series, of the graph coding unit 1150, the graph Laplacian unit 1130 and the DFT unit 1160. Every time a superpixel $P^i$ is to be encoded, the CPU first activates the graph coding unit 1150, which compresses the black and white image corresponding to the superpixel border and computes the weights matrix W corresponding to superpixel and stores it into memory.

Next, the CPU activates the graph Laplacian unit 1130, which fetches from the memory the weights matrix W, computes the eigenvectors U and stores them in the memory 1140. At this point, the CPU may dispose of the recovered weights matrix W from the memory because not required anymore at the encoder. Subsequently the CPU activates the DFT unit 1160, which fetches from the memory the eigenvectors U and computes the matrix of Fourier transform coefficients $P^\wedge$ which are stored in the memory unit 1140. At this point, the CPU may dispose of the eigenvectors U from the memory because not required anymore at the encoder.

Finally, the CPU fetches the set of compressed superpixel borders and the set of transform coefficients $P^\wedge$ from memory and puts them into the channel or saves them into the storage media 1200 by means of output means 1180 (e.g., an USB, Firewire, SATA or Ethernet controller or the like).

The encoding and apparatus described above may be controlled by the CPU to internally operate in a pipelined fashion, enabling to reduce the overall time required to process each image. Notice also than many other operations may need to be performed on the output of the coding device 1100 before it is sent on the channel or memorized on a storage unit, like modulation, channel coding (i.e., error protection). Anyhow those operations are irrelevant for embodying the present invention and are therefore neglected.

Summarizing, the encoding apparatus 1100 executes a method for encoding digital images or video streams that comprises the following phases:

a receiving phase, wherein at least a portion of an image f is received by means of the input means 1170;

a segmentation phase, wherein the portion of said image f is segmented, by means of the processing means 1110, in order to obtain one or more groups of pixels $P^i$ which are identified by borders information $P^b$ of the pixel groups (superpixels) obtained by the segmentation, wherein each group of pixels contains at least two pixels having a predetermined level of similarity according to at least one similarity metrics;

a weight-map computation phase, wherein a weight map $W^i$ is computed for each group of pixels $P^i$, by means of the processing means 1110, on the basis of the borders information $P^{bi}$ associated to said group of pixels ($P^i$);

a (graph) transform matrix computation phase, wherein, for each group of pixels $P^i$, a transform matrix $U^i$ is computed by means of the processing means 1110; in some embodiments such transform matrix $U^i$ contains the eigenvectors of the Laplacian matrix of the weight map $W^i$;

transform coefficients computation phase, wherein, for each group of pixels $P^i$, transform coefficients $f^{\wedge i}$ are computed on the basis of said transform matrix $U^i$ and the pixels contained in said group of pixels;

outputting phase, wherein the borders information $P^b$ and the transform coefficients $f^{\wedge i}$ of each group of pixels $P^i$ are outputted, by means of the output means 1180, to the destination 1200.

Decoding Process

Figure 10:
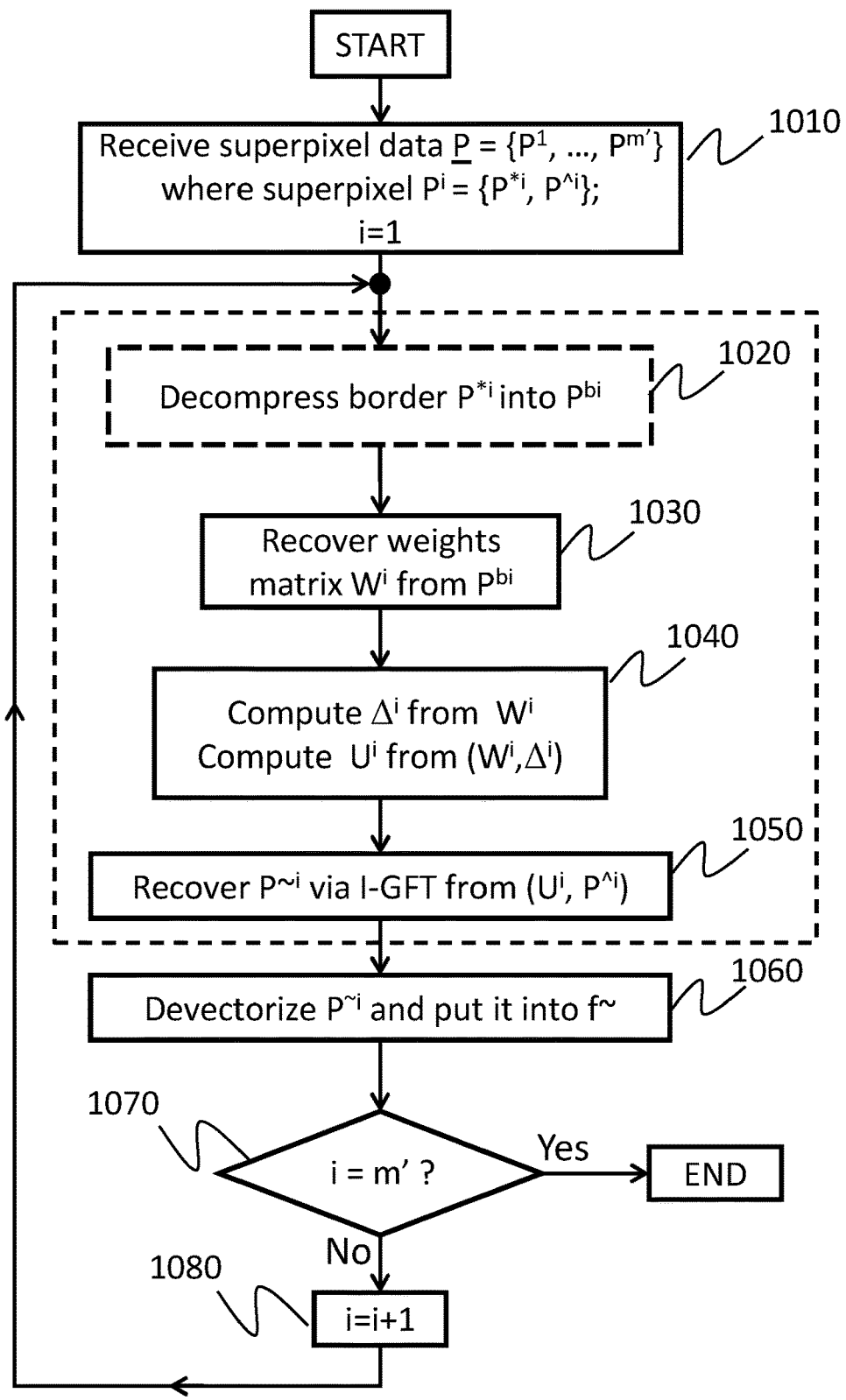
FIG. 10 is a flow chart which illustrates the recovery of the image f~ starting from a list P of m' encoded superpixels, where each superpixel Pi is independently decoded.

The process to recover an image f encoded with the above described superpixel-based technique is illustrated in terms of a flow chart in FIG. 10. The decoder apparatus 1100 receives a list of m' encoded graph Fourier transformed superpixels $\underline{P}^{\wedge}=\{P^{\wedge 1}, \ldots, P^{\wedge m'}\}$, where each i-th superpixel is composed by a (compressed) black and white border image and a vector representing the superpixel transform coefficients as $P^{\wedge i}=(P^{i*}, P^{\wedge i})$ at step 1010. The current superpixel index i is initialized at value 1.

Each i-th superpixel is decoded independently from the other m'−1 superpixels that compose the original image f, thus the decoder may not need to have received all the m' encoded superpixels to start the decoding process: rather, it may decode the coded superpixels as they get to the decoder. A detailed description of a complete superpixel decoder architecture in terms of its functional units is provided in the following description of FIG. 2(*b*). An overview of the superpixel decoding procedure is provided herein.

Figure 1:
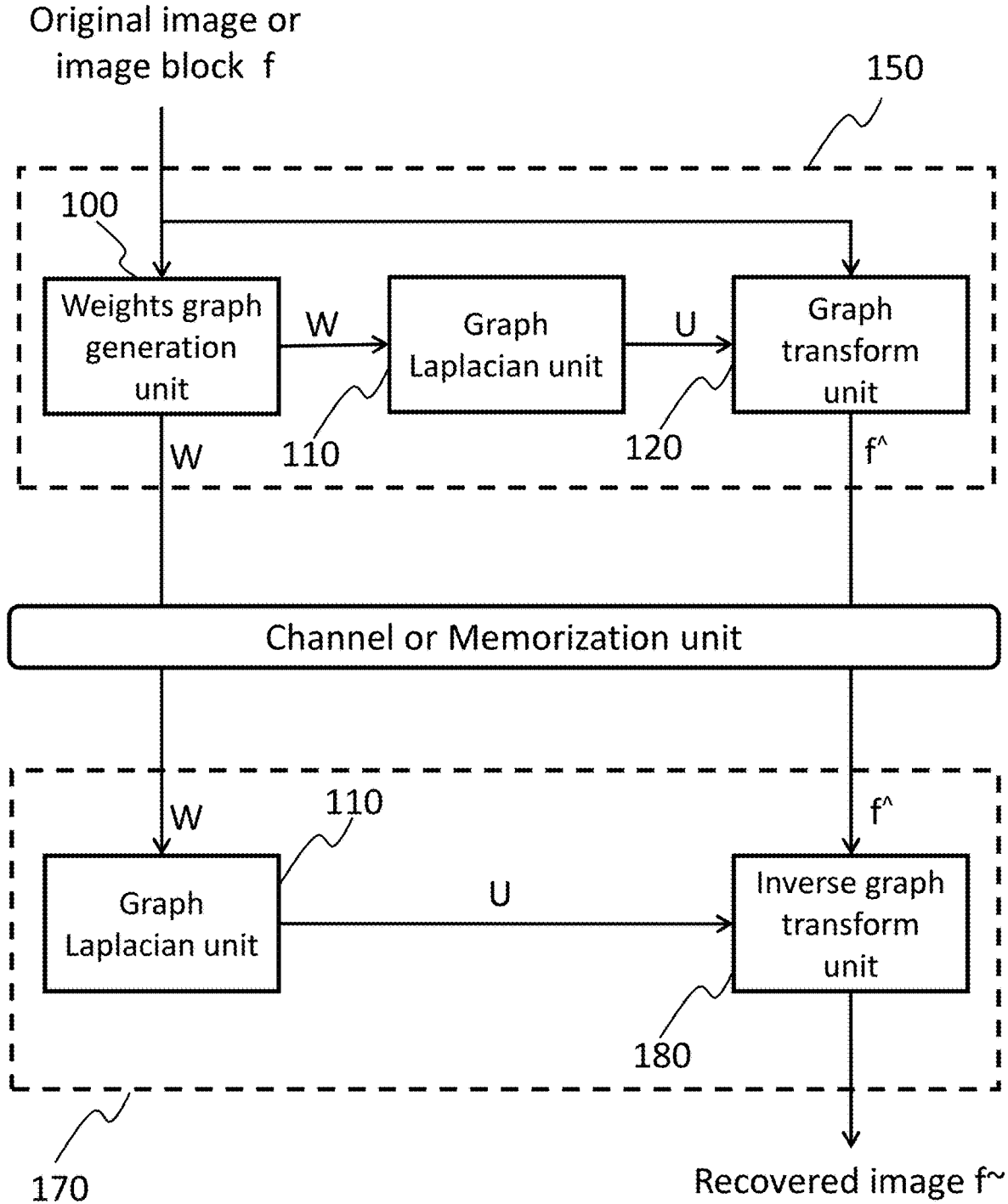
FIG. 1 shows a block diagram of a typical, known graph transform based image encoding-decoding architecture based on fixed-shape (e.g., square) coding units in terms of the basic unit that it comprises.
Figure 2:
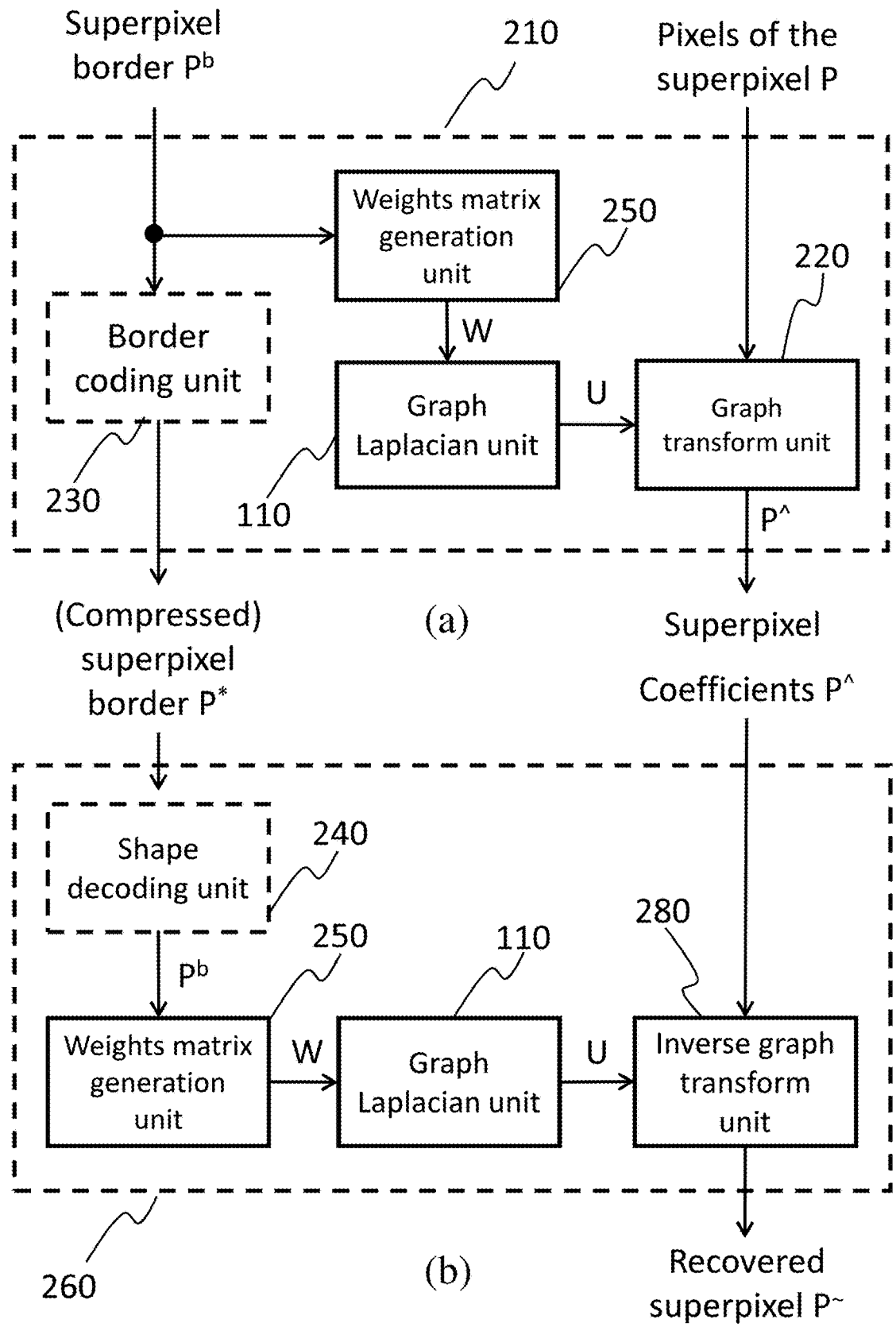
FIG. 2 shows a block diagram describing the overall conceptual architecture of an image encoding and decoding scheme implemented according to the present invention. In particular FIG. 2(*a*) shows a block diagram of an embodiment of the graph transform based image encoding-decoding architecture according to the present invention where each superpixel is independently encoded. Complementarily, FIG. 2(*b*) shows a block diagram of an embodiment of the graph transform based image decoding architecture according to the present invention where each encoded superpixel is independently decoded.

First, if compressed, the border $P^{i*}$ is decompressed by the optional shape decoding unit 240 (FIG. 2(*b*)) during optional step 1020: for example, if the border image was compressed with a JBIG encoder as described above, then the border image will be decompressed with a JBIG decoder at the receiver side. The output of this step is a black and white image $P^{bi}$ which has the same size of the original image f and contains a mask which indicates which pixels of the image belong to the i-th considered superpixel.

Next, at step 1030 the weights matrix $W^i$ is recovered from the superpixel border image $P^{bi}$. Assuming that the i-th superpixel mask in $P^{bi}$ includes N pixel, matrix $W^i$ will have size N×N, where each element $w^i_{i,j}$ is equal to "1" if pixels $f_i$ and $f_j$ in the original image belonged to the same superpixel $P^i$ and were adjacent, and is equal to "0" otherwise. In the following, a detailed description of the algorithm which allows to recover $W^i$ is provided.

Following, at step 1040 the texture of the superpixel $P^i$ is recovered via the inverse graph transform. First, the diagonal matrix $\Delta^i$ is computed from $W^i$, and then the eigenvectors matrix $U^i$ and its inverse $(U^i)^{-1}$ are computed; in the present case $(U^i)^{-1}$ is equal to $(U^i)^T$ since in this particular case $U^i$ is composed by the eigenvectors of the Laplacian matrix of W'. Finally, at step 1050 the multiplication between the N×N matrix $(U^i)^T$ and the N×1 vector $P^{\wedge i}$ is performed, which returns the N×1 vector $P^{\sim i}$, which contains the values of the pixels which constitute the (possibly approximated) superpixel texture in raster scan order.

Finally, in step 1060 the N×1 vector $P^{\sim i}$ representing the recovered superpixel texture is devectorized, populating those pixels of the recovered image f~ which belong to the i-th superpixel just decoded. For the sake of simplicity, in the following we will temporarily drop from the notation the index "i" indicating the superpixel number within the image to be recovered (i.e., we will write $P^b$ in place of $P^{bi}$, $P^{\wedge}$ in place of $P^{\wedge i}$, etc.) Let $P^{\sim}$ be the j-th element of vector $P^{\sim}$, with 1<=j<=N. Let $P^b$ be the j-th element of the superpixel border in raster scan order, i.e., the j-th pixel of the original image f such that it belongs to superpixel P. From the border image $P^b$, the exact coordinate of $P^b$ are recovered, that we call $(x,y)_j$. Once the target coordinates are known, the j-th pixel of the superpixel is recovered simply by copying the value within $P^{\sim}$ into $f_{(x,y)}$. Such procedure can be implemented as a simple copy in memory and is repeated for each j-th element of P~, until the whole superpixel texture is devectorized and the superpixel is recovered in f~.

Resuming our original notation, once the i-th superpixel $P^i$ has been decoded, the decoder checks if there are more superpixels to decode, i.e., checks whether the superpixel index i has not reached the value m' (step 1070). If so, the counter i is incremented at step 1080 and the procedure of steps 1020-1070 is repeated. Otherwise, the image recovery process is complete and the procedure ends. Notice that whereas we described the process to recover the image f~ as a serial procedure where superpixels are decoded one after another, in another embodiment the superpixels could be decoded totally or partly in parallel so to speed up the recovery process, assuming that enough computational resources are available.

Single Superpixel Decoder Architecture

The superpixel decoder, whose architecture is illustrated in FIG. 2(*b*), implements the functional blocks enclosed within a dashed line in FIG. 10 and is here described in terms of its functional units. For the sake of simplicity we dropped the generic superpixel index i in this figure. The superpixel decoder is composed by at least a superpixel border decoding unit 240, a weights graph generation unit 250, a graph Laplacian unit 110, one inverse graph transform unit 280 which operate each as detailed below.

The optional superpixel border decoding unit 240 takes in input the possibly compressed superpixel border P* and outputs a decompressed representation of the superpixel $P^b$. The unit performs the inverse process with respect to the process performed by the superpixel coding unit 230 found at the encoder. For example, in the above description of unit 230, it was exemplified that the unit 230 may encode the superpixel border using the JBIG scheme for compression of bi-level images (ISO/IEC standard 11544 and as ITU-T recommendation T.82), in order to further reduce the bandwidth or storage capacity required for the channel or the memorization unit.

Consequently, for the purpose of exemplification, in an embodiment of the present invention the unit 240 may decode the compressed superpixel border P* using the JBIG decoding algorithm. The output of the block is the back and white image $P^b$ which represents the border of the superpixel to decode. Since this operation is unessential, the compression unit 230 and decompression unit 240 are depicted in dashed lines. For example, FIG. 9(*b*) shows two possible embodiments to represent a superpixel P, like the generic $P^i$ superpixel resulting from an image partitioning. Namely, on the left we have the case where all the pixels belonging to the superpixel are indicated with "1"'s and correspond to black pixels in the image, whereas all the other pixels would be indicated with "0"'s and correspond to white pixels. On the right, only the pixels corresponding to the superpixel inner border are represented with "1"'s, whereas the other pixels would be represented with "0"'s.

The weights matrix generation unit 250 found at the decoder is equivalent to the weights matrix generation unit 250 found to the encoder and serves the identical purpose of taking in input the superpixel border $P^b$ and producing in output the relative weights matrix W.

The graph Laplacian unit 110 found at the decoder is analogous to the graph Laplacian unit 110 found at the encoder side: it takes in input the weights matrix W and outputs the N×N transform matrix U.

First, the unit computes the N×N diagonal matrix Δ from W such that the i-th element of its diagonal is equal to the sum of all the weights of all the edges incident into the i-th pixel, as described, in W. Second, the unit computes the N×N matrix L=Δ−W.

Finally, the inverse graph transform unit 280 takes in input the transform matrix U and translates it generating the N×N matrix $U^T$. Second and finally, the unit multiplies the N×N matrix $U^T$ by the N×1 coefficients vector $P^{\wedge}$ and recovers (an approximate reconstruction of) the original N×1 superpixel texture, that we denote as P~, as $$P{\sim}=U^T P^{\wedge}.$$

FIG. 12(b) illustrates a decoding apparatus 1300 suitable for carrying on the decoding process corresponding to the scheme in FIG. 2(b). The Central Processing Unit (CPU) 1110 oversees the decoding process and activates the proper sequence of units required to perform the sequence of operations corresponding to the scheme in FIG. 2(b). The CPU first fetches the coded superpixel borders P* and transform coefficients P^ from the channel or storage media 1200 by means of input means 1170 (e.g., an USB, Firewire, SATA or Ethernet controller or the like), and loads them into the memory unit 1140. Prior to accessing P* and P^, it may be necessary to carry out the same inverse operations performed on the input data by the encoder, such as demodulation and error correction, i.e., typical channel decoding operations, not shown in the figure. Next, the CPU activates the optional border decoding unit 1150, the graph Laplacian unit 1130 and the Inverse DFT Unit 1260, which performs the decoding process of the decoding device 260 shown in FIG. 2. For each superpixel to be decoded for reconstructing the original image, the CPU first activates the optional border decoding unit 1150 which fetches the compressed superpixel border from the memory and stores the decompressed superpixel border black and white image $P^b$ in memory. Next, the superpixel decoder unit 1120 fetches from the memory the border map $P^b$, executes the workflow illustrated in FIG. 11 and stores in memory the recovered weights matrix W.

At this point, the CPU may dispose of the superpixel border $P^b$ from the memory because not required anymore to recover the superpixel. Subsequently the CPU activates the graph Laplacian unit 1130, which fetches from the memory the recovered weights graph W, computes the eigenvectors U and stores them in the memory. At this point, the CPU may dispose of the recovered weights matrix W from the memory because not required anymore to recover the superpixel.

Next, the CPU activates the inverse DFT unit 1260, which fetches from the memory the eigenvectors U and the transform coefficients P^ and recovers the superpixel texture P, which is stored in memory in a master picture canvas where the recovered superpixels are stored. Such procedure is repeated for each superpixel into which the original picture f was encoded. Finally, the CPU may fetch from memory the recovered image f~ and send it to the display unit 1400 or copy it into another memory unit by means of output video means 1170 (e.g., an USB, Firewire, SATA or Ethernet controller or a VGA or HDMI adapter or the like).

Summarizing, the decoding apparatus executes a method for decoding digital images that comprises the following phases:

a first receiving phase, wherein borders information $P^b$ individuating groups of pixels ($P^i$) pertaining to a segmentation of at least an image portion and transform coefficients $f^{\sim i}$ of groups of pixels $P^i$ are received by means of input means 1180;

a weight-map reconstruction phase, wherein, for each group of pixel $P^i$, a weight map $W^i$ is reconstructed, by means of the processing means 1110, on the basis of the borders information $P^{bi}$ associated to said group of pixels;

an eigenvectors computation phase, wherein, for each group of pixels $P^i$, eigenvectors of the Laplacian matrix of the weight map $W^i$ are computed by means of the processing means 1110;

groups reconstruction phase, wherein, for each group of pixel $P^i$, a reconstructed group of pixels $P^{\sim i}$ is computed on the basis of the transform coefficients $f^{\sim i}$ and the eigenvectors $U^i$ by means of the processing means 1110 by preferably operating an inverse graph Fourier transform on such coefficients $f^{\sim i}$;

image reconstruction phase, wherein a reconstructed image f~ is computed, through the processing means (1110), by aggregating the reconstructed groups of pixel $P^{\sim}$;

output phase, wherein the reconstructed image f~ is outputted through output video means 1270.

Experimental Results

FIG. 13(a) shows an example of the typical reconstruction artifacts generated at the decoder by the standard 8×8 pixel DCT. The square blocks borders cross discontinuities in the image such as the boundary between the beak of the bird in the foreground and the background resulting in the reconstruction artifacts clearly visible in the picture. Conversely, FIG. 13(b) shows the same image encoded and decoded according to the present invention. In particular, the bird beak and the background belong to two different superpixels, thus the discontinuity between the two is left out at the boundary between the superpixels resulting in a crisp representation of the boundary between the two objects.

Figure 13:
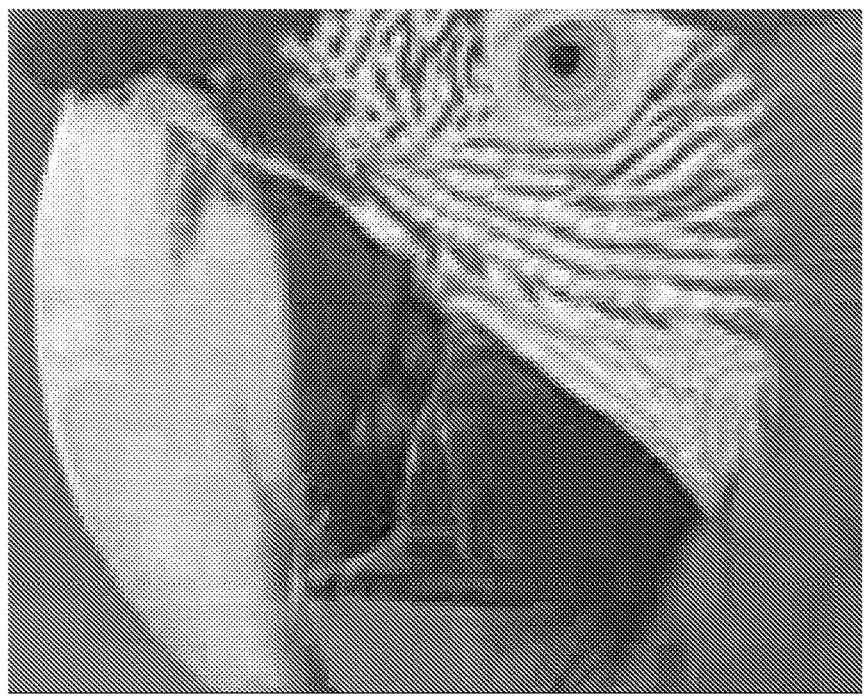
FIG. 13 shows: in (a) an example of the typical reconstruction artifacts generated at the decoder by the standard 8×8 pixel DCT; in (b) the same image encoded and decoded according to the present invention.
Figure 13:
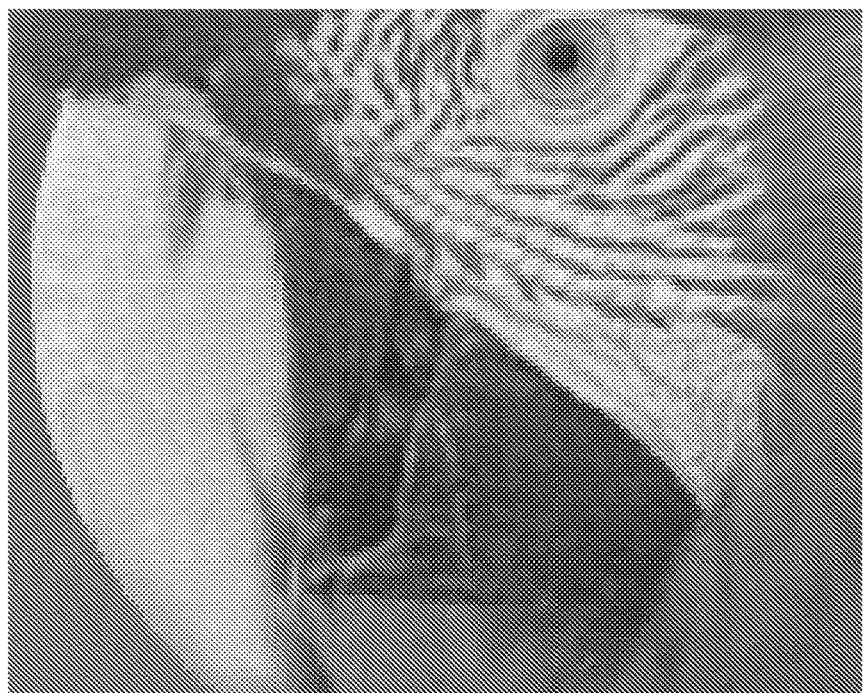
Figure 14:
Figure 14:
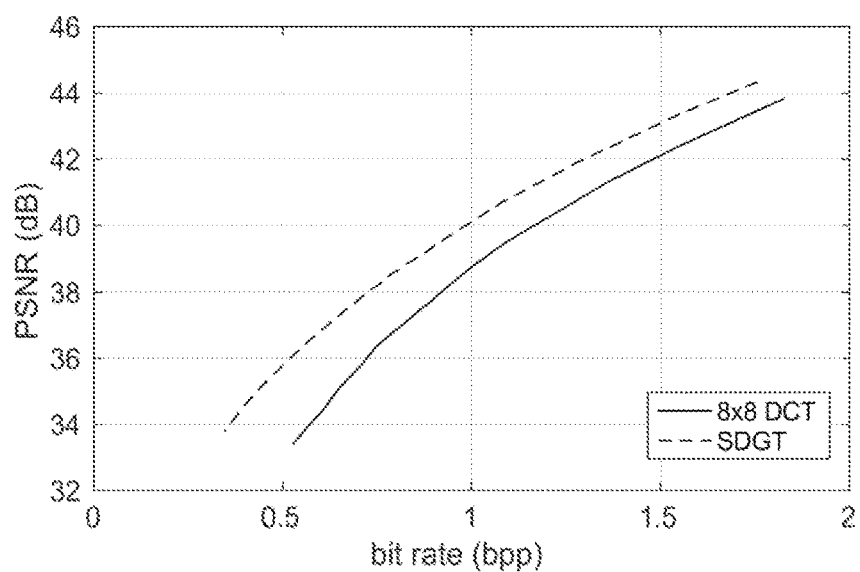

FIGS. 14(a) and (b) show, respectively, a larger version of the test image in FIG. 13 and the corresponding rate-distortion curve for when the image is encoded and decoded according to the present invention and a reference architecture where the 8×8 pixel DCT is employed instead. In particular, FIG. 14(b) shows on the x axis the coding rate in terms of bits per pixel (bpp), i.e., the average number of bits required to encode one pixel. This measure includes both the encoding of the coefficients and the encoding of the superpixel border for the scheme proposed in the present invention according to the JBIG standard. Conversely, the y axis shows the PSNR between the original and decoded image measured on the Y channel. The figure shows that the coding and decoding scheme according to the present invention enables better image quality for lower coding rate. Namely, the improved rate-distortion efficiency is due to the largely reduced coding rate relative to the transform coefficients and the reduced distortion due to leaving the image discontinuities at the boundaries between the superpixels.

Other Embodiments and Generalizations

In the detailed description of an embodiment of the invention, the clustering and graph Fourier transform are carried out in sequence in an iterative way, since the clustering or segmentation reduction is carried out on the basis of the target encoding rate; this requires that clustering and graph transform are performed one after the other in a single iteration. This is not necessary for carrying out the invention; also other procedure are possible; for example first a clustering procedure is put in place entirety before the superpixel driven graph Fourier transform (i.e., without any relation with the subsequent GFT transform), and afterwards the superpixels' set resulting from the clustering process are GFT transformed.

In such an embodiment, the superpixels' number coming out from the clustering process can be set in a very simple way according to an heuristic approach. Usually, particularly for natural images, there is an optimal value for the number of superpixels m' to be individually encoded via shape encoding and GFT transform that is related to the overall pixel's number of the image. If we indicate with $N_P$ the desired average number of pixels in a superpixel of the segmentation, m' is related to it and to the pixel number K of the image f by the following relation:

$$m'=K/N_P$$

According to the experiments made by the inventors on a large set of natural (i.e., non artificial) images, a good value for m lies in the range 300-1000, and for m' in 50-150. Therefore the initial segmentation reduction can be executed until a certain pre-determined value of m' is reached during such reduction process and then perform the superpixel-driven GFT transform afterwards, individually and separately on each of the m' superpixels.

In an embodiment of the present invention, the image to be coded may be preliminarily filtered so to remove high frequency components and reduce the resulting coding bitrate. Examples of appropriate filters include Gaussian or linear or bi-linear or cubic filtering.

In another embodiment, the image may be segmented in superpixels using a different segmentation scheme than the SLIC algorithm considered in the present description. Suitable image segmentation algorithms include the normalized cuts algorithm (Jianbo Shi, Jitendra Malik, "Normalized Cuts and Image Segmentation", IEEE Transactions on Pattern Analysis and Machine Intelligence, Volume 22 Issue 8, August 2000) the algorithm by Felzenswalb and Locker (Pedro Felzenszwalb, Daniel P. Huttenlocher, "Efficient graph-based image segmentation", International Journal of Computer Vision 59.2, 2004) among the others.

In another embodiment of the superpixel clustering algorithm, the border and transform coefficients coding rates could be predicted at least in part according to a model based on the collected encoding statistics rather than being measured by actually graph-encoding the superpixel for reduced encoding complexity.

In another embodiment, the superpixel clustering may be based on a rate-distortion tradeoff metric rather than simply on meeting a maximum tolerable target bitrate over the image. In such embodiment after a certain encoding trial according to the invention the image is immediately decoded, the original image is compared with its decoded version, the rate distortion tradeoff is calculated and the tentative encoding is kept or not basing on the resulting tradeoff, or on the distortion introduced by the encoding process and/or from combination of the rate and the distortion.

In another embodiment, the similarity or the dissimilarity between two superpixels may be measured as the difference between other color representation metrics than the CIEDE2000 metric considered in the present description. Suitable color metrics include the Mahalanobis distance (Prasanta C. Mahalanobis, "On the generalized distance in statistics", in National Institute of Sciences of India, Calcutta, India, 1936, vol. 2, pp. 49-55) and the Bhattacharyya distance (Anil K. Bhattacharyya, "On a measure of divergence between two statistical populations defined by their probability distributions", Bulletin of Calcutta Mathematical Society, vol. 35, no. 1, pp. 99-109, 1943).

In another embodiment, the geometry of a single superpixel could be described by the polygon which spans over the inner border of the superpixel itself using a vectorial representation in place of a black and white image. This saves space in representing the border of the superpixel.

In another embodiment, the overall geometry of the superpixels could be represented as a black and white image where black (or white) pixels represent the boundaries which separate two superpixels as illustrated in FIG. 3(c): the advantage of this latter embodiment is that each border common to two neighbor superpixels is encoded only once, hence reducing the border encoding rate and increasing the compression efficiency.

In another embodiment, the monochrome image representing the superpixel borders may be compressed using chain codes such as (H. Freeman, "On the encoding of arbitrary geometric configurations", IRE Transactions on Electronic Computers EC, Vol. 10(1961)) or (E. Bribiesca, "A new chain code", IEEE Transactions on Pattern Recognition, Vol. 32 (1999)) in place of the JBIG codec discussed in the present description.

In another embodiment, the monochrome image representing the superpixel borders may be compressed exploiting existing techniques for piecewise smooth images compression like for example the depth maps used in DIBR-based rendering such as the arithmetic-coding based scheme described in (I. Daribo, D. Florencio, G. Cheung, "Arbitrarily shaped motion prediction for depth video coding using arithmetic edge coding", 2012 19th IEEE International Conference on Image Processing (ICIP), 30 2012).

In other embodiments of the invention, the graph transform coefficients f̂ (usually contained in a vector) are determined on the basis of the reconstructed weight map W' in any other way than that illustrated herewith, i.e., by computing the graph transform coefficients f̂ via a graph transform matrix U composed by the eigenvectors of the graph Laplacian matrix of W'.

In another embodiment, the transform coefficients f̂ are further compressed with existing coding techniques prior they are put on the channel or memorized in a storage unit and is decompressed at the receiver prior it is processed by the graph decoding unit. Suitable coding techniques include non-uniform quantization, zig-zag scanning, differential coding and entropy coding.

The invention can be adapted so as to be used for compressing also color images. In case of an RGB image, for example, the invention can be used to compress at least one of the R G or B components; since the components are in general strongly correlated, at least as far as the edges are concerned, it is possible to infer or predict the edges of the other components basing on those of the starting one. Analogously, in case of a YUV coded color image, the luminance component Y can be compressed according to the invention, while the chroma components U and V can be compressed and decompressed in a similar way as their difference signal from Y (Y−U and Y−V), with some adaptations taking into account the different statistical features of the chroma components with respect to luminance.

The invention can be also integrated in a video coding technique wherein also the temporal correlation between different images of the video sequence must be taken into account. To that end, a prediction mechanism similar to those used in the conventional video compression standards can be used in combination with the invention for effectively compressing and decompressing a video signal.

The terms image and image block used in the present description as input bi-dimensional signal must be interpreted in their broadest meaning. They can encompass pixel values directly derived or extracted from a natural image, an artificial image, the prediction error of an image, a sub-sampled version of an image at higher resolution, any portion of said kind of images, and so on.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. An apparatus for encoding digital images, comprising:
an input unit configured for acquiring at least a portion of an image (f) from a source,
an output unit configured for outputting at least a portion of an encoded image to a destination,
at least one processing unit configured for:
a) reading at least a portion of said image (f),
b) segmenting the portion of said image (f) in order to obtain one or more groups of pixels forming a connected, homogeneous image region of arbitrary shape (superpixel ($P^i$)), wherein the groups are individuated by borders information ($P^{bi}$) and each superpixel ($P^i$) contains pixels having a predetermined level of similarity according to at least one similarity metrics,
c) operating, individually for each superpixel ($P^i$), a graph transform for obtaining graph transform coefficients ($f^{\sim i}$) on the basis of the pixels contained in said superpixel ($P^i$),
d) outputting, by means of the output unit, the borders information ($P^{bi}$) and the graph transform coefficients ($f^{\sim i}$) of each superpixel ($P^i$) to said destination.

2. The encoding apparatus according to claim 1, wherein the at least one processing unit is also configured for:
e) computing similarity information between two or more neighbour superpixels ($P^i$) according to at least one similarity metrics, in order to evaluate the level of similarity between said neighbour superpixels ($P^i$), and for aggregating two or more neighbour superpixels ($P^i$) on the basis of said similarity level, so as to obtain a new segmentation of said at least a portion of an image having a lower number of superpixels' groups.

3. The encoding apparatus according to claim 2, wherein step e) is repeated on subsequently different superpixels ($P^i$) until at least one of the following conditions is satisfied:
the overall rate for representing the border information and the graph transform coefficients of the superpixels of the new segmentation in the encoded form is lower than a predetermined threshold,
the overall distortion relative to at least an image portion of the encoded image represented by the border information and the graph transform coefficients of the superpixels of the new segmentation is lower than a predetermined threshold,
the number of superpixels ($P^i$) in the new segmentation is lower than a predetermined threshold.

4. The encoding apparatus according to claim 1, wherein step c) comprises:
calculating a weight map (Wi) on the basis of the borders information ($P^{bi}$) associated to a superpixels ($P^i$),
calculating a graph transform matrix ($U^i$) on the basis of said weight map (Wi) and
calculating the graph transform coefficients ($f^{\sim i}$) on the basis of said graph transform matrix ($U^i$) and of the pixels contained in said superpixels,
wherein the elements ($w^i_{i,j}$) of said weight map ($W^i$) indicates the level of similarity between pairs of neighbour pixels ($f_i$, $f_j$) within said superpixels ($P^i$).

5. The encoding apparatus according to claim 4, wherein said elements ($w^i_{i,j}$) of the weight map ($W^i$) comprises binary values which are not null values only for pairs of pixels ($f_i$, $f_j$) within superpixel ($P^i$) that are considered adjacent.

6. The encoding apparatus according to claim 5, wherein pairs of pixels ($f_i$, $f_j$) are considered adjacent if they lie in the same row and in two consecutive columns or if they lie in the same column and in two consecutive rows of the image portion.

7. An apparatus for decoding digital images, comprising:
an input unit configured for acquiring at least an encoded portion of an image (f) from a communication channel or a storage media,
an output video unit configured for outputting a reconstructed image (f~),
at least one processing unit configured for:
a) receiving, through the input unit, borders information ($P^{bi}$) individuating groups of pixels forming a connected, homogeneous image region of arbitrary shape (superpixels ($P^i$)) pertaining to a segmentation of at least an image portion and graph transform coefficients ($f^{\sim i}$) of said superpixels ($P^i$),
b) operating, individually for each superpixels ($P^i$), an inverse graph transform of said graph transform coefficients ($f^{\sim i}$) in order to obtain reconstructed superpixels ($P^{\sim i}$),
c) computing a reconstructed image (f~) by aggregating the reconstructed superpixels ($P^{\sim i}$) on the basis of said borders information ($P^{bi}$),
d) outputting, through said output video unit the reconstructed image (f~).

8. The decoding apparatus according to claim 7, wherein step b) comprises:
computing a weight map ($W^i$) on the basis of the borders information ($P^{bi}$) associated to said superpixels, and
computing individually for each superpixel ($P^i$) an inverse graph transform matrix (($U^i)^{-1}$) on the basis of the weight map ($W^i$), and a reconstructed superpixels ($P^{\sim i}$) on the basis of graph transform coefficients ($f^{\sim i}$) and said inverse graph transform matrix (($U^i)^{-1}$),
wherein the elements ($w^i_{i,j}$) of said weight map ($W^i$) indicate the level of similarity between pairs of neighbour pixels ($f_i$, $f_j$) within said superpixels ($P^i$, $P^{\sim i}$).

9. The decoding apparatus according to claim 8, wherein the elements of ($w^i_{i,j}$) said weight map ($W^i$) comprises binary values which are not null values only for pairs of pixels within a superpixel ($P^i$) that are considered adjacent.

10. The decoding apparatus according to claim 9, wherein pairs of pixels ($f_i$, $f_j$) are considered adjacent if they lie in the same row and in two consecutive columns or if they lie in the same column and in two consecutive rows of the reconstructed image portion.

11. A method for encoding digital images or video streams, comprising:
a receiving phase, wherein at least a portion of an image (f) is received by means of an input unit;
a segmentation phase, wherein the portion of said image (f) is segmented, by at least one processing unit, in order to obtain one or more groups of pixels forming a connected, homogeneous image region of arbitrary shape (superpixel ($P^i$)) which are individuated by borders information ($P^{bi}$), wherein the superpixel contains at least two pixels having a predetermined level of similarity according to at least one similarity metrics,
a graph transform phase, wherein each superpixel ($P^i$), is individually and independently transformed by the at least one processing unit into graph transform coefficients ($P^{\sim i}$), on the basis of the pixels forming said superpixels ($P^i$), an outputting phase, wherein the borders information ($P^{bi}$) and the graph transform coefficients ($f^{\sim i}$) of each superpixel ($P^i$) are transmitted to a destination by means of the output unit.

12. The encoding method according to claim 11, wherein said graph transform phase comprises:
    calculating a weight map ($W^i$) on the basis of the borders information ($P^{bi}$) associated to a superpixel ($P^i$),
    calculating a graph transform matrix ($U^i$) on the basis of said weight map ($W^i$) and
    calculating the graph transform coefficients ($f^{\sim i}$) on the basis of said graph transform matrix ($U^i$) and of the pixels forming said superpixels,
    wherein the elements ($w^i_{i,j}$) of said weight map ($W^i$) indicate the level of similarity between pairs of neighbour pixels ($f_i$, $f_j$) forming said superpixel ($P^i$, P).

13. The encoding method according to claim 12, wherein said elements ($w^i_{i,j}$) of the weight map ($W^i$) comprise binary values which are not null values only for pairs of pixels ($f_i$, $f_j$) within a superpixel ($P^i$) that are considered adjacent.

14. A method for decoding digital images, comprising:
    a receiving phase, wherein borders information ($P^{bi}$) individuating groups of pixels forming a connected, homogeneous image region of arbitrary shape (superpixel ($P^i$)) pertaining to a segmentation of at least an image portion and graph transform coefficients (f~i) of said superpixels ($P^i$) are received by means of an input unit,
    an inverse graph transform phase, wherein, individually for each superpixel ($P^i$), an inverse graph transform of said graph transform coefficients ($f^{\sim i}$) is operated in order to obtain reconstructed image superpixels ($P^i$),
    an image reconstruction phase, wherein a reconstructed image (f~) is computed, through the processing means, by aggregating the reconstructed superpixels ($P^i$) on the basis of said borders information ($P^{bi}$),
    an output phase, wherein the reconstructed image (f~) is outputted through an output video unit.

15. The decoding method according to claim 14, wherein said inverse graph transform phase comprises:
    computing a weight map ($W^i$) on the basis of the borders information ($P^{bi}$) associated to said superpixels, and
    computing individually for each superpixel ($P^i$) an inverse graph transform matrix (($U^i$)$^{-1}$) on the basis of the weight map ($W^i$), and a reconstructed superpixel ($P^{\sim i}$) on the basis of graph transform coefficients ($f^{\sim i}$) and said inverse graph transform matrix (($U^i$)$^{-1}$),
    wherein the elements ($w^i_{i,j}$) of said weight map ($W^i$) indicate the level of similarity between pairs of neighbour pixels ($f_i$, $f_j$) forming said superpixel ($P^i$ $P^{-1}$).

16. The decoding method according to claim 15, wherein the elements ($w^i_{i,j}$) of said weight map ($W^i$) comprise binary values which are not null values only for pairs of pixels within a superpixel ($P^i$) that are considered adjacent.

* * * * *